US011898911B2

(12) United States Patent
Jovanovic et al.

(10) Patent No.: US 11,898,911 B2
(45) Date of Patent: Feb. 13, 2024

(54) BROADBAND ALL-PHOTONIC SPECTRUM SHAPERS

(71) Applicant: California Institute of Technology, Pasadena, CA (US)

(72) Inventors: Nemanja Jovanovic, Sierra Madre, CA (US); Jeffrey B. Jewell, Pasadena, CA (US); Pradip R. Gatkine, Pasadena, CA (US); Gautam Vasisht, Pasadena, CA (US); Charles A. Beichman, Pasadena, CA (US); Nick Cvetojevic, Nice (FR)

(73) Assignees: CALIFORNIA INSTITUTE OF TECHNOLOGY, Pasadena, CA (US); OBSERVATOIRE DE LA COTE D'AZUR, Nice (FR)

( * ) Notice: Subject to any disclaimer, the term of this patent is extended or adjusted under 35 U.S.C. 154(b) by 0 days.

(21) Appl. No.: 17/958,097

(22) Filed: Sep. 30, 2022

(65) Prior Publication Data

US 2023/0102648 A1 Mar. 30, 2023

Related U.S. Application Data

(60) Provisional application No. 63/250,424, filed on Sep. 30, 2021.

(51) Int. Cl.
*G01J 3/28* (2006.01)
*G02F 1/225* (2006.01)
*G02F 1/21* (2006.01)
*G01J 3/12* (2006.01)

(52) U.S. Cl.
CPC . *G01J 3/28* (2013.01); *G01J 3/12* (2013.01); *G02F 1/212* (2021.01); *G02F 1/225* (2013.01)

(58) Field of Classification Search
CPC ........ G01J 3/28; G01J 3/12; G01J 3/02; G01J 3/14; G01J 3/18; G01J 3/10; G01J 3/44
See application file for complete search history.

(56) References Cited

U.S. PATENT DOCUMENTS

| 7,733,923 B2 * | 6/2010 | Doerr | H01S 5/026 372/18 |
| 10,006,809 B2 * | 6/2018 | Hu | G02F 1/3136 |

OTHER PUBLICATIONS

Kurokawa, T., et al., "Time-Space-Conversion Optical Signal Processing using Arrayed-Waveguide Grating", Technical Digest, Pacific Rim Conference on Lasers and Electro-Optics, 1999, pp. 809-810, vol. 3.
Miyamoto, D., et al., "Waveform-Controllable Optical Pulse Generation Using an Optical Pulse Synthesizer", IEEE Photonics Technology Letters, Feb. 2006, pp. 721-723, vol. 18, No. 5.
(Continued)

*Primary Examiner* — Abdullahi Nur
(74) *Attorney, Agent, or Firm* — GATES & COOPER LLP

(57) ABSTRACT

A photonic integrated circuit including an input for receiving input electromagnetic radiation having a bandwidth greater than 60 nm; a spectral splitter splitting the electromagnetic radiation into a plurality of spectral channels; a modulator for modulating an amplitude and a phase of one or more of the spectral channels so as to form modulated outputs; and a spectral recombiner for combining the modulated outputs into a single output port outputting output electromagnetic radiation having the desired output spectral intensity profile shaped by and synthesized from the modulated outputs.

20 Claims, 15 Drawing Sheets

(56) References Cited

OTHER PUBLICATIONS

Weiner, A.M., "Ultrafast optical pulse shaping: A tutorial review", Optics Communications, Jul. 2011, pp. 3669-3692, vol. 284, Issue 15.
Roelens, M.A.F., et al., "Multi-wavelength synchronous pulse burst generation with a wavelength selective switch", Optics Express, 2008, pp. 10152-10157, vol. 16, No. 14.
Lewis, S.A.E., et al., "Rayleigh Noise Suppression Using a Gain Flattening Filter in a Broadband Raman Amplifier", Optical Fiber Communication Conference, Mar. 2000, pp. 109-111, vol. 37.
Harumoto, M., et al., "Gain-Flattening Filter Using Long-Period Fiber Gratings", Journal of Lightwave Technology, Jun. 2002, pp. 1027-1033, vol. 20, No. 6.
Baxter, G., et al., "Highly programmable Wavelength Selective Switch based on Liquid Crystal on Silicon switching elements", Optical Fiber Communication Conference and the National Fiber Optic Engineers Conference, 2006, pp. 1-3.
Moroz, P., et al., "Lifting the Spectral Crosstalk in Multifluorophore Assemblies", J. Phys. Chem. C, 2017, pp. 26226-26232, vol. 121, No. 47.
Probst, R., et al., "Spectral flattening of supercontinua with a spatial light modulator", Proc. SPIE, Techniques and Instrumentation for Detection of Exoplanets, Sep. 2013, pp. 706-713, vol. 8864.
Fischer, D., et a., "State of the Field: Extreme Precision Radial Velocities", Publications of the Astronomical Society of the Pacific, Jun. 2016, pp. 1-43, vol. 128, No. 964.
Gibson, R.K., et al., "Characterization of the C-RED 2: A High Frame Rate Near-Infrared Camera," arXiv e-prints arXiv:1911.04567, 2019, pp. 1-17.
Takiguchi, K., et al., "Flexible pulse waveform generation using a silica waveguide based spectrum synthesis circuit", Optical Fiber Communication Conference, Feb. 2004, pp. 1-3.
Leal-Junior, A., et al., "Low-cost and high-resolution pressure sensors using highly stretchable polymer optical fibers", Materials Letter, 2020, pp. 1-3, vol. 271, 127810.
Caucheteur, C., et al., "Mode-division and spatial-division optical fiber sensors", Advances in Optics and Photonics, Mar. 2022, pp. 1-86, vol. 14, No. 1.
Wang, Z., et al., "Taper-in-taper fiber structure-based LSPR sensor for alanine aminotransferase detection", Optics Express, Dec. 2021, pp. 43793-43810, vol. 29, No. 26.
Xu, K., "Silicon electro-optic micro-modulator fabricated in standard CMOS technology as components for all silicon monolithic integrated optoelectronic systems", Journal of Micromechanics and Microengineering Apr. 2021, pp. 1-10, vol. 31, No. 5, 054001.
Gatkine, P., et al., "Potential of commercial SiN MPW platforms for developing mid/high-resolution integrated photonic spectrographs for astronomy", Applied Optics, Jul. 2021, pp. D15-D32, vol. 60, No. 19.
Rank, E.A., et al., "Toward optical coherence tomography on a chip: in vivo three-dimensional human retinal imaging using photonic integrated circuit-based arrayed waveguide gratings", Light: Science & Applications, 2021, pp. 1-15, vol. 10, No. 6.
Jovanovic, N., et al., "An all-photonic, dynamic device for flattening the spectrum of a laser frequency comb for precise calibration of radial velocity measurements", Proc. of SPIE, Advances in Optical and Mechanical Technologies for Telescopes and Instrumentation V, Aug. 2022, pp. 1-8.
Cvetojevic, N., et al., "Closed-loop on-chip phase control and fringe tracking in photonic interferometers", Optical and Infrared Interferometry and Imaging VIII, Aug. 2022, pp. 1-3, vol. 12183, https://doi.org/10.1117/12.2630002.

* cited by examiner

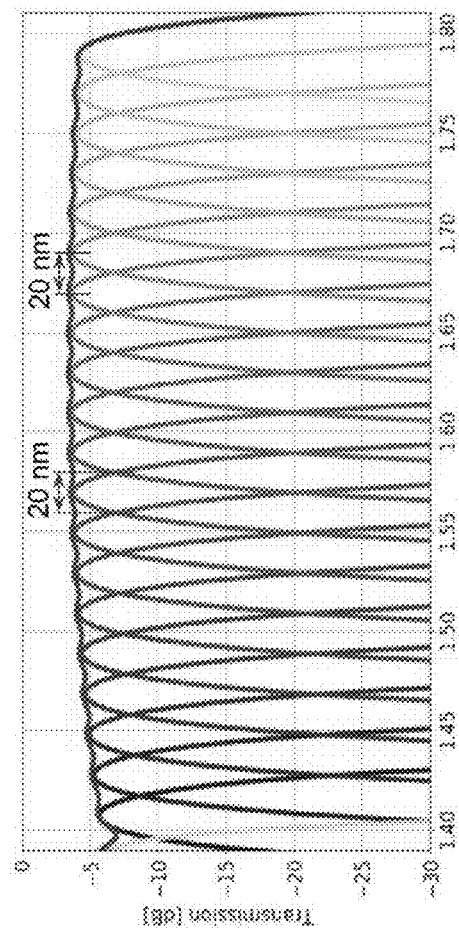
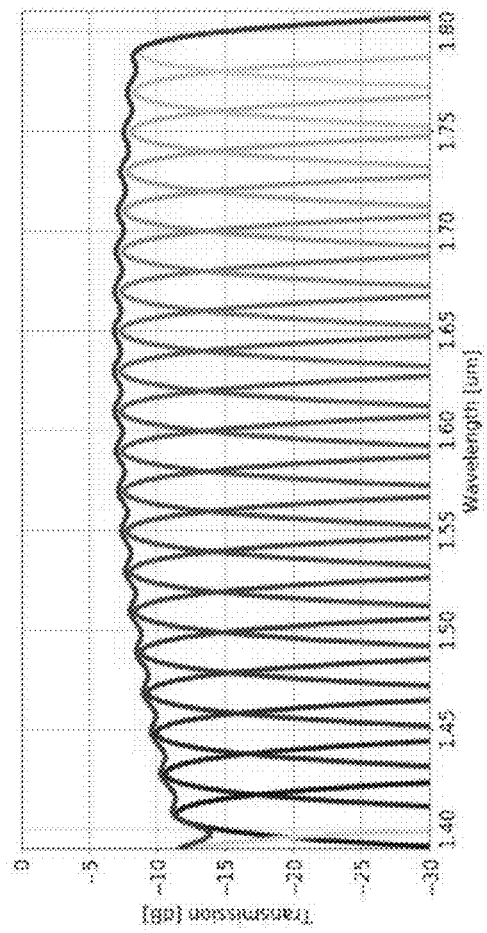
Fig. 7A
Fig. 7B

BROADBAND ALL-PHOTONIC SPECTRUM SHAPERS

CROSS REFERENCE TO RELATED APPLICATIONS

This application claims the benefit under 35 U.S.C. Section 119(e) of the following commonly assigned patent application which is incorporated by reference herein:

U.S. Provisional Patent Application Ser. No. 63/250,424 filed on Sep. 30, 2021, by Nemanja Jovanovic, Jeffrey B. Jewell, Pradip R. Gatkine, Gautam Vasisht, Charles A. Beichman, Nick Cvetojecic, entitled "BROADBAND ALL-PHOTONIC SPECTRUM FLATTENERS FOR LASER FREQUENCY COMBS," CIT-8709.

STATEMENT REGARDING FEDERALLY SPONSORED RESEARCH AND DEVELOPMENT

This invention was made with government support under Grant No. 80NMO0018D0004 awarded by NASA (JPL). The government has certain rights in the invention.

BACKGROUND OF THE INVENTION

1. Field of the Invention

This invention relates to spectrum modulators and methods of making and using the same.

2. Description of the Related Art

Spectral shaping is useful for many applications including temporal pulse shaping [1-4], gain flattening [5,6], add/drop multiplexing [7] and other applications in telecommunications as well as the targeted excitation of particular molecular species [8]. Laser/optical frequency combs (LFCs) are critical for precision wavelength calibration and metrology in many fields, including astronomy. The brightness of the comb lines varies by many orders of magnitude across a broad spectrum (see FIG. 1). Typical detectors used in astronomical spectrographs do not have the dynamic range to sense all the lines with adequate signal-to-noise simultaneously. The spectrum needs to be flattened to ensure the brightness of the lines is within the limited dynamic range of detectors and stable with time.

Commercial and in-house LFCs typically use "flatteners" to address this issue. FIG. 2 illustrates a conventional bulk optical system (comprising lenses, gratings, etc.) that receive the light from an optical fiber, disperse it, adjust the intensity of various parts of the spectrum (typically using spatial light modulators) and then recombine the light into another optical fiber, which can route the signal to a spectrograph. However, these bulk optic spectrum flatteners are expensive, bulky, and difficult to stabilize mechanically and thermally.

Moreover, the evolution of the comb profile of an LFC can vary over a broad range of timescales from milliseconds to hours and is significantly smaller (1 to 10 dB) than the amplitude differences across the spectrum. Unfortunately, any changes to the comb profile can masquerade as erroneous Doppler shifts and needs to be mitigated. These variations necessitate that the flattener be a dynamic element that can track and control the evolution in the spectrum with time.

What is needed are improved spectrum flatteners that can also be used to dynamically shape the spectrum as a function of time with increased mechanical and thermal stability. The present disclosure satisfies this need.

SUMMARY OF THE INVENTION

Example devices according to embodiments described herein include, but are not limited to, the following.

1. A device useful as an arbitrary spectral shaper, comprising: a photonic integrated circuit, comprising:
   an input for receiving input electromagnetic radiation having a bandwidth greater than 60 nm;
   a spectral splitter connected to the input, the spectral splitter splitting the electromagnetic radiation into a plurality of spectral channels each transmitting a different subband of the bandwidth, wherein at least one of the following: the bandwidth, a spectral spacing of the spectral channels, the subband, or a number of the spectral channels is adjusted as a function of the spectral intensity profile of the input electromagnetic radiation and a desired output spectral intensity profile;
   a modulator, connected to the spectral splitter, for modulating an amplitude and a phase of one or more of the spectral channels so as to form modulated outputs, wherein the modulator further comprises drop ports redirecting rejected portions of the electromagnetic radiation away from the photonic integrated circuit so as to suppress noise; and
   a spectral recombiner, connected to the output of the modulator, for combining the modulated outputs into a single output port outputting output electromagnetic radiation having the desired output spectral intensity profile shaped by and synthesized from the modulated outputs.

2. The device of example 1, wherein the photonic integrated circuit is formed on a single substrate or chip, or multiple substrates or chips.

3. The device of example 1, wherein:
   the spectral splitter and the recombiner each comprise grating (e.g., array waveguide gratings or photonic echelle gratings) each having an output, and
   the modulator comprises:
   a plurality of variable optical attenuators for modulating the amplitude, the variable optical attenuators each connected to a different one of the outputs of the spectral splitter and having a plurality of output ports and the drop ports; and
   a plurality of phase modulators connected to the variable optical attenuators, and
   each of the phase shifters connected to a different one of the variable optical attenuators and downstream to a different one of the array waveguide gratings inputs in the recombiner.

4. The circuit of example 1, wherein:
   the modulator comprises an amplitude controller attenuating the amplitude of one or more of the spectral channels so as to form a plurality of attenuated spectral channels; and
   the modulator further comprises a phase controller connected to the amplitude controller, wherein the phase controller shifts the phase of one or more of the spectral channels so as to form the modulated outputs each having their optical path lengths appropriately adjusted for the combining in the recombiner.

5. The device of example 1, wherein, for a subset of the subbands comprising region(s) of the spectral intensity profile varying over a spectral scale smaller than the subbands:
the subbands are smaller or narrower (i.e., have a smaller or narrower range of wavelengths, or are designed to have a smaller or narrower range of wavelengths), and/or
the number of the spectral channels transmitting the subset of the subbands is increased,
so that the regions of the spectral intensity profile are modulated with higher resolution.
6. The device of example 1, wherein the modulator comprises:
an amplitude controller comprising one or more interferometers comprising coupled pairs of waveguides, or
a nonlinear crystal (e.g., lithium niobate) modulator modulating the amplitude using an electrooptic or piezo-switching effect.
7. The device of example 6, wherein:
the amplitude controller comprises a plurality of electrodes, and each of the electrodes are coupled to the nonlinear crystal or one of the waveguides in each of the pairs.
8. The circuit of example 7, wherein the electrodes are thermally or electrically coupled to the waveguides so as to modulate phase, and thereby the amplitude transmitted by the amplitude modulator, in response to resistive heating, piezoelectric actuation, or electrooptic actuation of the electrodes controlled by control signals applied to the electrodes.
9. The device of example 8, further comprising a driving circuit coupled to the electrodes, the driving circuit outputting the control signals controlling the modulation of the amplitude and/or the phase of one or more of the spectral channels so as to form the desired output spectral intensity profile.
10. The device of example 9, further comprising:
a spectrum analyzer for measuring a frequency spectrum of the output electromagnetic radiation; and
a computer or control circuit coupled to the driving circuit and the spectrum analyzer, the control circuit determining the control signals from feedback comprising the frequency spectrum.
11. The device of any of the examples, wherein the input electromagnetic radiation comprises a plurality of wavelengths between 380-2500 nm and the spectral channels each transmit the subband having a wavelength spread in a range of 0.5 nm-100 nm.
12. The device of example 11, wherein the number of the spectral channels, the subband of each spectral channel, and the spacing between the spectral channels, are adjusted such that the output power of the output electromagnetic radiation varies across its entire bandwidth by less than 5 dB.
13. The device of example 3, wherein each of the VOAs comprise a Mach Zehnder interferometer:
splitting the spectral channel received in the interferometer into a first component and a second component phase shifted relative to the first component; and
interfering the first and second components so as to attenuate an intensity of the spectral channel.
15. The device of example 14, wherein the interferometer comprises a first arm coupled to a second arm, the first arm is coupled to an electrode for modulating a phase of the first component transmitted in the first arm relative to the second component transmitted in the second arm.
16. The device of example 15, wherein the dispersor and the combiner each comprise an arrayed waveguide gratings or echelle gratings.
17. A system comprising:
a laser frequency comb (LFC), a laser, or a communications network, or a spectrometer coupled to the device of any of the examples, wherein system transmits the input electromagnetic radiation to the input and/or receives the output electromagnetic radiation from the single output port.
18. An arbitrary pulse shaper comprising the device of any of the examples 1-17.
19. An arbitrary spectral shaper comprising the device of any of the examples 1-17.
20. An arbitrary waveform generator comprising the device of any of the examples 1-17.
21. A gain flattening filter comprising the device of any of the examples 1-17.
22. An optical switch comprising the device of any of the examples 1-17.
23. The system of claim 17, wherein the system comprises the spectrometer and the output electromagnetic radiation has the desired output spectral intensity profile tailored for an interaction with a pre-determined molecular species.
21. The device of any of the examples, wherein the spectral channels comprise cascaded spectral channels wherein a plurality of the spectral channels are further split into an additional stage of sub-channels comprising narrower subbands and each having their amplitude and their phase individually modulated by the modulator.
22. The device of any of the examples, wherein the drop ports couple the rejected portions of the electromagnetic radiation to a spectrum analyzer for measurement of the frequency spectrum of the desired output spectral intensity profile.
23. A system comprising the device of any of the examples, further comprising:
a client instrument coupled to the modulator, so that an output from the client instrument may be used to control the amplitude transmitted by the spectral channels, via the modulator;
a spectrograph coupled to the single output port via a fiber, wherein the spectrograph measures the frequency spectrum of the desired output spectral intensity profile;
the drop ports coupled to vertical or grating couplers transmitting the rejected light off the photonic integrated circuit to a detector,
a chip comprising the photonic integrated circuit, the photonic integrated circuit further comprising waveguides coupled to the drop ports and routed to an edge of the chip, for transmission of the rejected portions of the electromagnetic radiation off the chip; or
one or more photodetectors on the chip comprising the photonic integrated circuit, the photodetectors coupled to the photonic integrated circuit so as to detect the rejected portions of the electromagnetic radiation and/ or the output electromagnetic radiation.

BRIEF DESCRIPTION OF THE DRAWINGS

Referring now to the drawings in which like reference numbers represent corresponding parts throughout:

FIGS. 7A-7C. Theoretical transmission spectrum of the single pass AWG (FIG. 7A) as well as the back-to-back AWGs (FIG. 7B). The colors represent each output channel of the AWG. The red line is the cumulative transmission across all channels. FIG. 7C. A simulated spectrum for a cascaded device based on SiN waveguides and having the architecture in FIG. 5B. (schematic and simulations carried out by BRIGHT Photonics Inc.).

FIG. 9A: Normalized measured transmission spectrum of the single AWG. The various spectra represent the response of each spectral channel's output. The data were normalized to the reference waveguide/loop back. This process removes the contribution of coupling losses to/from the chip leaving only the losses of the component/device. The curved base is due to the spectral profile of the light source and represents the noise floor of the measurement. N.B: the noise floors vary because of the varying signal levels of the super-luminescent diode used, which forces the Fourier Transform OSA to switch gain to maximize dynamic range for each measurement. FIG. 9B. Same plot but only showing the 1610 nm channel so the substructure can be more easily inspected. The OSA noise floor is highlighted at the edges of the spectrum. The ripples in the center are real structure indicating there is sub-structure for that spectral channel but at 30+dB below the peak of the channel. (Inset) Spectral profile of the super-luminescent diode light source.

FIG. 11A: Spectral response of the full device. The orange trace shows the transmission of the device with no power applied. The green is when the MZIs and TOPMS are adjusted for maximum throughput while maintaining flatness. The purple trace is when they are adjusted for minimum throughput, and the red for an arbitrary level in the middle of the range. The data were normalized to the reference waveguide/loop back (blue line at 0 dB). This process removes the contribution of coupling losses to/from the chip leaving only the losses of the component/device. FIG. 11B: Stability of the spectrum over a 12 hr period with 5 minute cadence. The maximum throughput flat state was used and the figure shows all spectra subtracted from the mean spectrum over that time series for the experiments, but the lab was stabilized by an air conditioning system to within ±0.5° C. After the experiment was setup, we departed the lab and waited 15 minutes before starting to acquire data to allow the setup to reach thermal equilibrium. The results are shown in the bottom panel of FIG. 11 (FIG. 11B). The data are shown for the region of the spectrum where there was good signal-to-noise on the OSA (1450 to 1625 nm), to not conflate instabilities brought about by the OSA with the BAPSS. It can be seen that traces generated over the ~ 12 hr period are highly overlapping with a scatter of <±0.1 dB, demonstrating an extraordinary level of stability.

FIG. 12A: LFC spectrum through the reference waveguide (blue), and through the BAPSS device with maximum throughput (orange), minimum throughput (purple), and two arbitrary flat levels (green and red). The OSA noise floor is shown in brown. FIG. 12B: the LFC spectrum taken through the reference waveguide with and without optical attenuation. Both plots were acquired with an OSA slit resolution of 2 nm. FIGS. 12C-12D: Shows the same spectrum as the FIG. 12A plot, but with an OSA resolution of 0.05 nm. The full spectrum is shown in FIG. 12C and the zoom in of a 2 nm region around 1600 nm is shown in FIG. 12D. The comb lines are separable in the right plot. FIG. 12E: The difference spectrum between the maximum throughput trace with the LFC and with two MZI channels completely turned off. FIG. 12F: The difference spectrum between the maximum throughput trace with the LFC and with two TOPMs adjusted to reduce the light passing through the system. Both plots in FIGS. 12E-12F were acquired with an OSA slit resolution of 2 nm is therefore capable of working with power levels of typical LFCs.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

Figure 1:
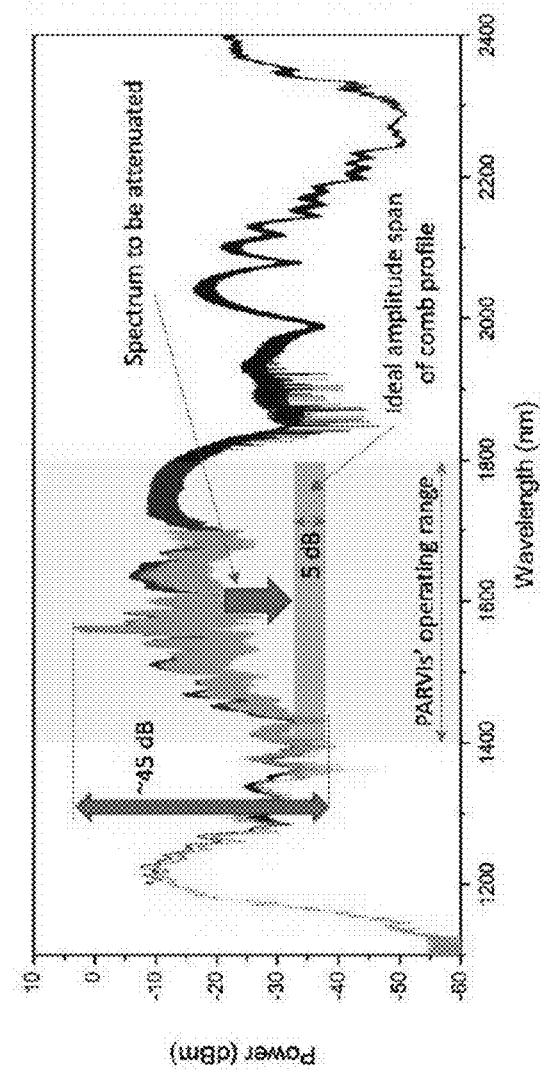
FIG. 1. Example spectrum of the LFC brightness from the PARVI instrument at the Palomar Observatory below. Every 10 dBm=a factor of 10.
Figure 2:
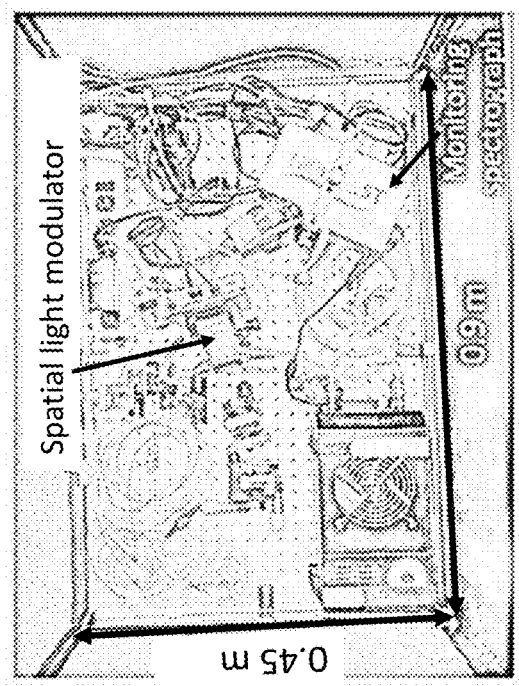
FIG. 2. Spectrum flattener comprising bulk optics.
Figure 3:
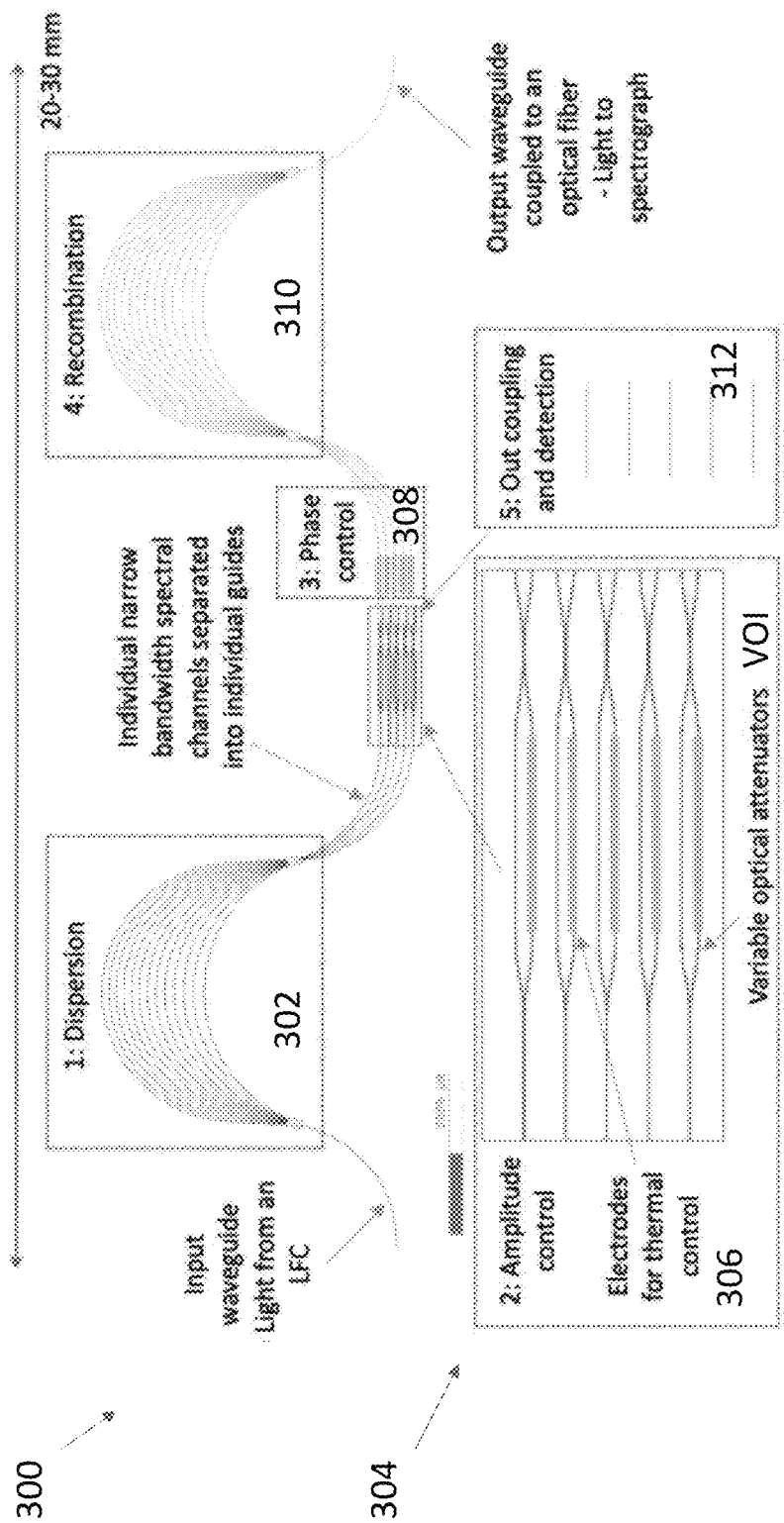
FIG. 3. Schematic of an all photonic flattener on a chip (BAPF) according to one or more embodiments described herein, comprising dispersor, amplitude controller, phase controller, recombiner, out coupler, and detector.

FIG. 3 illustrates an example broadband all-photonic flattener-on-a-chip (BAPF) 300 comprising a splitter/dispersor 302, a modulator 304 comprising an amplitude controller 306 and a phase controller 308, a recombiner 310, and out coupling 312 and detection (not shown). These elements, which may be implemented using telecom photonic components, are combined and controlled to perform the following functionalities.

Dispersion/splitting. To control the amplitude across the spectrum, the light from the client instrument is first separated into its constituent colors using the on-chip dispersor (also known as an integrated photonic spectrograph). In one or more examples, the dispersor comprises Arrayed Waveguide Gratings (AWGs). At the output of the AWG, each spectral slice is collected by a unique waveguide.

Amplitude Modulation. The amplitude controller comprises a plurality of variable optical attenuators (VOAs) and individual spectral slices are passed through one of the VOAs. Example VOAs include, but are not limited to, a Mach-Zehnder Interferometer (MZI). In one or more examples the amplitude controller comprises a thermal modulator and an electrode to adjust/address the VOA so as to thermally modulate the spectral channel connected to the VOA. An external power supply may be used to drive the thermal modulator.

Phase Modulation. In order to achieve successful recombination, the path length of all the waveguides between the dispersor and the recombiner must be carefully controlled, e.g. using a phase controller. In various examples, phase control can be performed in two stages using static delay lines and active delay lines. Static delay lines consist of waveguide loops comprising "s," "u" or spiral (e.g., Archimedean) shaped sections that delay the propagation of the light. For active control, electrodes are placed on the waveguides so that thermal phase shifters are formed to precisely control the phase. The spectrum is then recombined to feed to the downstream client instrument.

It is critical to measure the spectrum prior to flattening, so as to determine how the spectral components need to be modulated. Example measurement techniques include, but are not limited to:
 a. using the client instrument to drive changes to the modulators;
 b. picking off the light from the output single mode fiber and feeding to a compact COTS spectrograph for measurement;
 c. picking off the rejected light from the VOAs and using vertical or grating couplers transmitting the rejected light off-chip to a detector,
 d. picking off the rejected light from the VOA using waveguides routed to the edge of the chip for transmission of the rejected light off the chip; or
 e. installing active photodiodes on the chip.

After the spectrum has been appropriately modulated in each channel, the spectrum is combined into a single channel. Example recombiners include, but are not limited to, another integrated photonic spectrograph, or an AWG implemented in reverse configuration (as compared to the dispersor) so that the recombiner has only a single output waveguide from the AWG.

Example Process for Manufacturing an all-Photonic Spectrum Flattener

Figure 4:
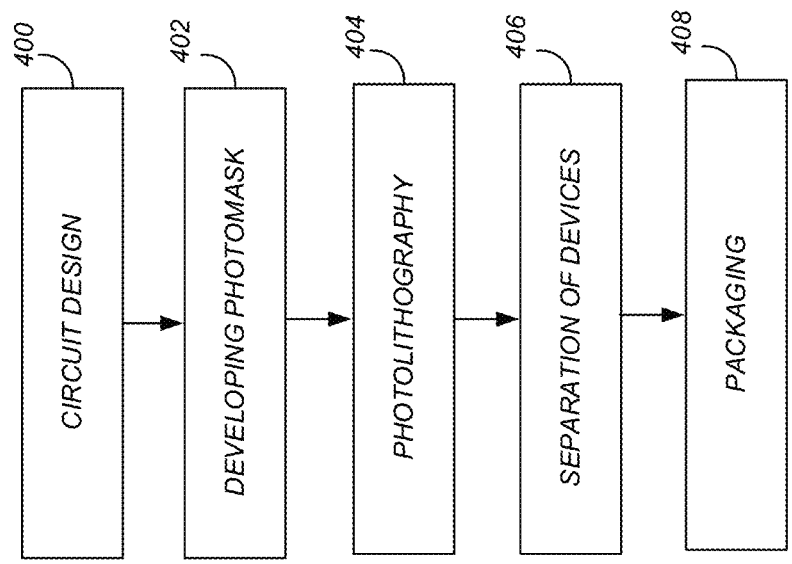
FIG. 4 is a flowchart illustrating a method of making a device according to one or more embodiments.

FIG. 4 is a flowchart illustrating a method of making an all-photonic spectrum flattener.

Figure 5A:
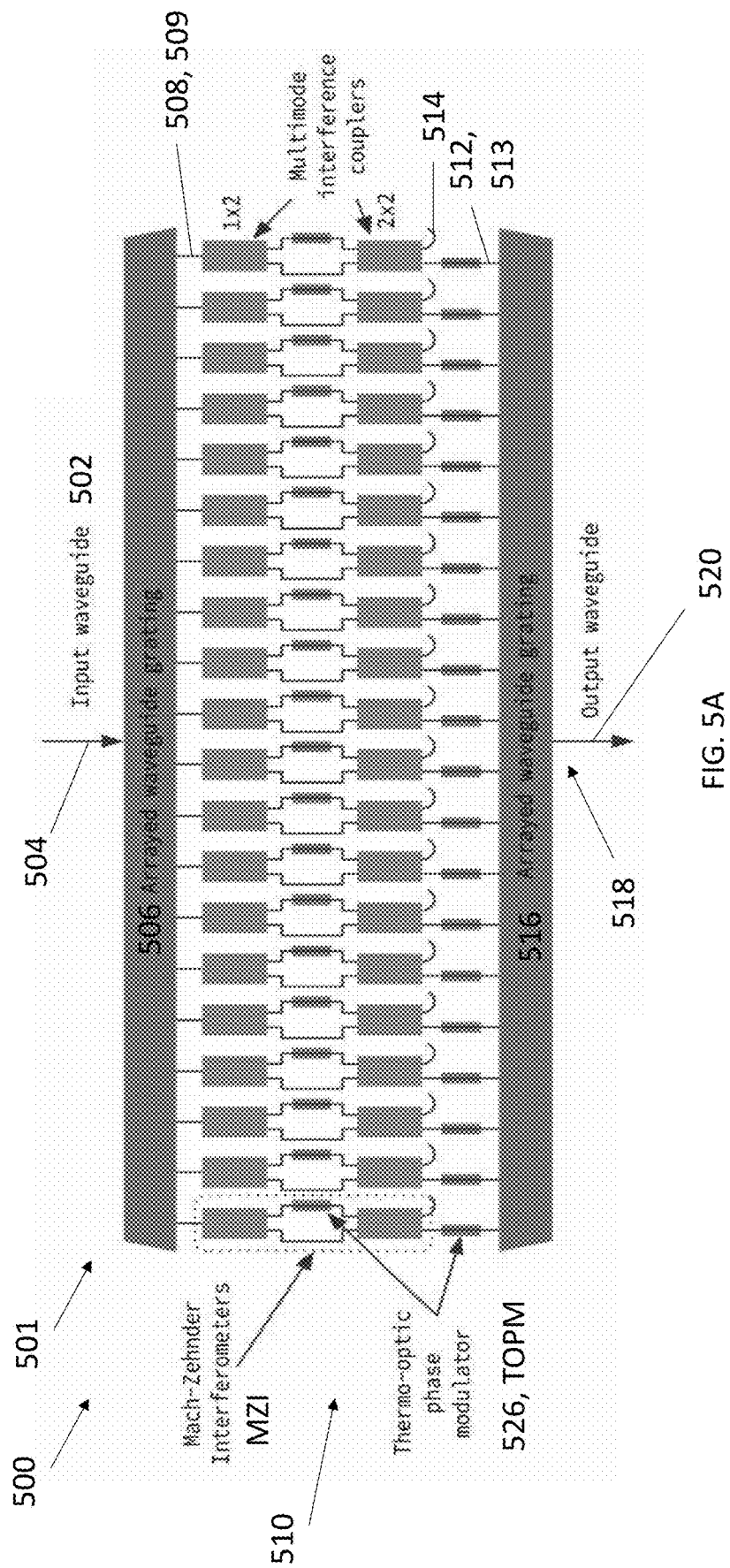
FIG. 5A. Schematic layout of the circuit architecture used for the photonic spectral shaper.

Block 400 represents designing the flattener circuit for the wavelength range of interest. The step comprises optimizing each component for the bandwidth and specific wavelength. Example optimization includes, but is not limited to, utilizing different channel bandwidths and number of channels depending on the application (e.g. spectral shaping requirement). For example, in a spectral flattening application, the degree of flattening dictates how many channels and their bandwidths, taking into account the spectrum of the light source. FIG. 5A illustrates an example architecture.

Block 402 represents developing a photomask for fabricating a plurality of the devices on a wafer.

Block 404 represents photolithographically fabricating the photonic circuit on a substrate using the photomask and according to the design. Silicon Nitride (SiN) photonic waveguides are a desirable platform for visible and NIR applications as they are transparent for the 400-2300 nm wavelength range. SiN is also typically optimized for a single polarization which is appropriate for applications using LFCs which are polarized.

Figure 5B:
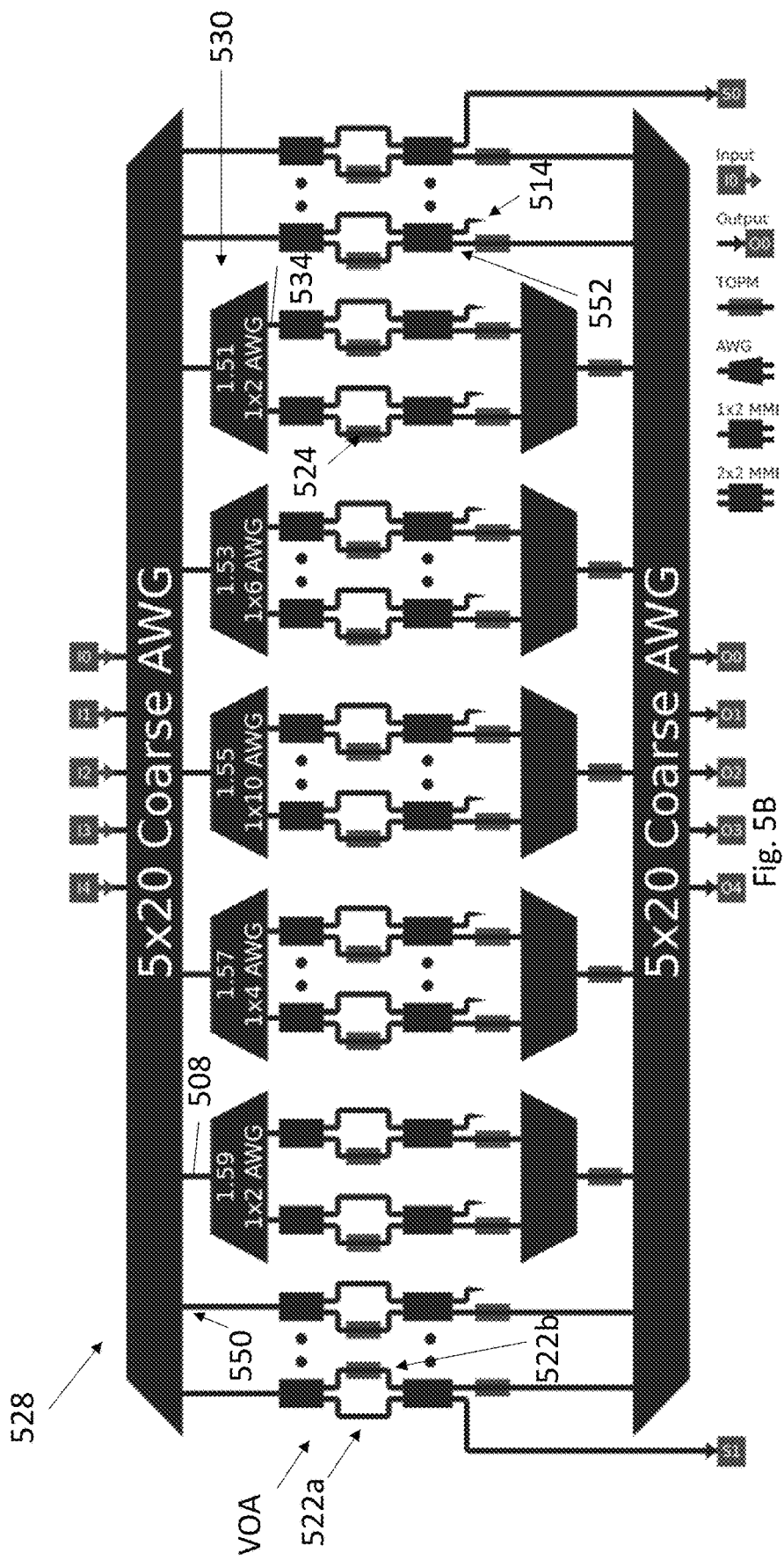
FIG. 5B. A schematic of an all-photonic flattener that uses cascaded AWGs to enable narrow linewidth channels in some regions of the spectrum.

However, a variety of material systems may be used to manufacture the photonic chip depending on the application. FIGS. 5A and 5B illustrate example architectures that can be used as arbitrary spectral shapers or optimized to meet the needs of flattening the light from an LFC.

Block 406 represents separating (e.g., dicing or etching) the device off the wafer and polishing the surfaces that have optical interconnects. The step may include polishing.

Figure 6:
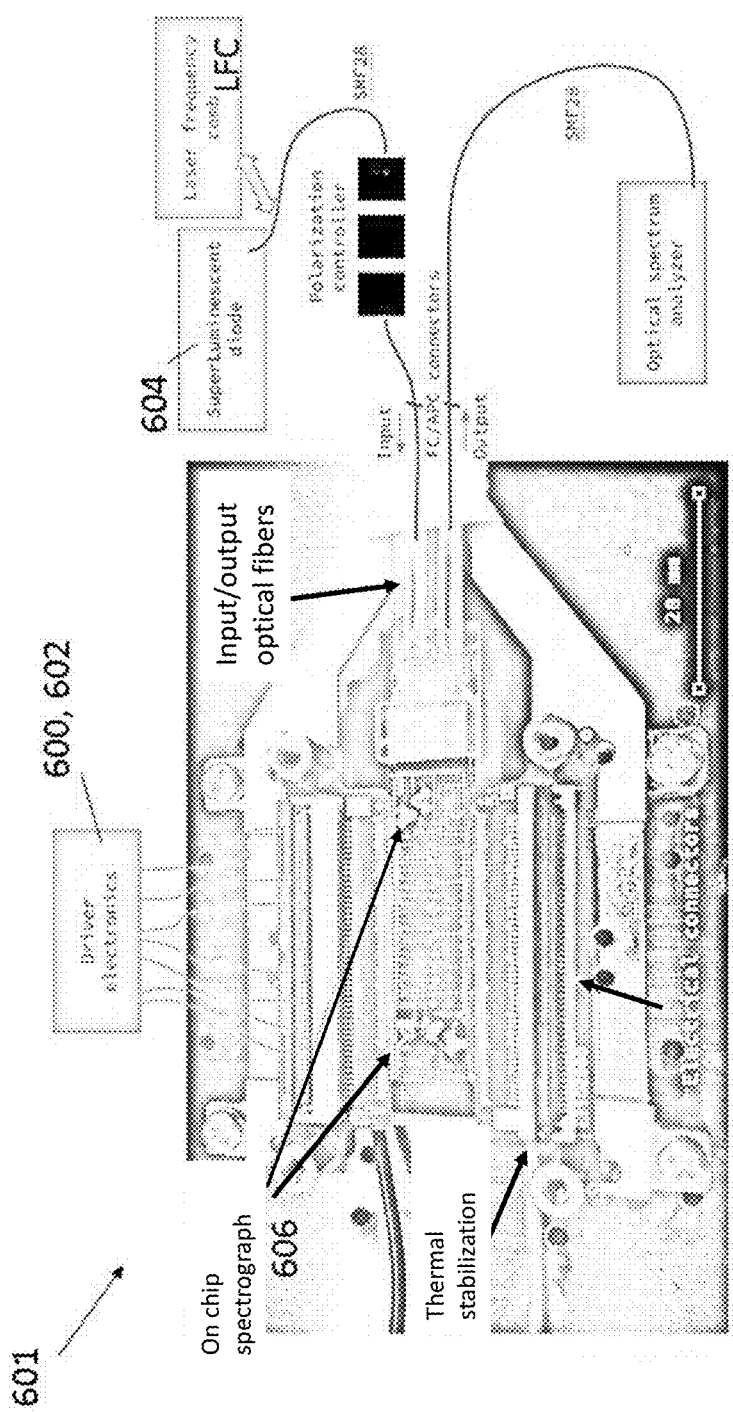
FIG. 6. Experimental setup for characterizing the broadband all-photonic spectrum shaper. The light source for the tests was either a super-luminescent diode or an LFC. A paddle wheel polarization controller was used to align the polarization of the source with the TE mode of the waveguides. Light was injected via a v-groove array. The fully packaged PIC is shown. The electrodes on the circuit (chromium plated) as well as the AWGs can easily be seen in the photo. The output was routed to an OSA.

Block 408 represents packaging the circuit, e.g., as illustrated in FIG. 6. The step may include bonding fibers to the input/output, mounting the chip on a thermally controlled base, and wiring the electrodes to a PCB that has electrical connectors for connection to control electronics.

In one or more examples, light is coupled into and from the chip to/from a client instrument (e.g., LFC) via a single mode fiber. The single mode fiber may be aligned and bonded to the input/output waveguide of the photonic chip. Tapers may be used on the chip (e.g. inverted, segmented, other) to minimize losses.

FIGS. 5A and 5B illustrate a device 500 useful as an arbitrary spectral shaper. The device comprises a photonic integrated circuit 501 comprising:
 an input 502 for receiving input electromagnetic radiation 504 having a bandwidth greater than 60 nm; a spectral splitter 506 connected to the input, the spectral splitter splitting the electromagnetic radiation into a plurality of spectral channels 508 (each comprising or transmitted by a different waveguide 509) each transmitting a different subband of the bandwidth, wherein at least one of the following: the bandwidth, a spectral spacing (e.g., wavelength spacing) of the spectral channels, the subband, or a number of the spectral channels is adjusted as a function of the spectral intensity profile of the input electromagnetic radiation and a desired output spectral intensity profile;
 a modulator 510, connected to the spectral splitter, for modulating an amplitude and a phase of one or more of the spectral channels so as to form modulated outputs 512 (each comprising or transmitted by a different waveguide 513 or port), wherein the modulator further comprises drop ports 514 redirecting rejected portions of the electromagnetic radiation away from the photonic integrated circuit 501 so as to suppress noise; and
 a spectral recombiner 516, connected to the output of the modulator, for combining the modulated outputs into a single output port 518 outputting output electromagnetic radiation 520 having the desired output spectral intensity profile shaped by and synthesized from the modulated outputs 512.

FIGS. 5A and 5B illustrate examples wherein the modulator comprises an amplitude modulator 521 comprising a plurality of VOAs comprise an interferometer (e.g., Mach Zehnder interferometer MZI) splitting the spectral channel received in the interferometer into a first component and a second component phase shifted relative to the first component; and interfering the first and second components so as to attenuate an intensity of the spectral channel. The interferometer comprises a first arm (e.g., comprising a first waveguide 522a) coupled to a second arm (e.g., comprising waveguide 522b), the first arm is coupled to an electrode 524 for modulating a phase of the first component transmitted in the first arm relative to the second component transmitted in the second arm.

The modulator 510 further comprises a phase controller or phase shifter 526 connected to the amplitude controller 521, wherein the phase controller shifts the phase of one or more of the spectral channels so as to form the modulated outputs each having their optical path lengths appropriately adjusted for the combining in the recombiner. Although FIGS. 5A and 5B show the phase controller connected to the output of the amplitude controller, other positionings of the phase shifter are possible. For example, the phase controller/shifter may also be positioned upstream of the amplitude controller, so that the output of the phase shifter is fed to the amplitude controller.

FIG. 5B illustrates an example device 528 wherein the spectral channels comprise cascaded spectral channels 530 wherein a plurality of the spectral channels are further split (by an additional stage of spectral splitters, e.g. AWG) into an additional stage 532 of sub-channels 534 comprising narrower subbands and each having their amplitude and their phase individually modulated by their own VOA in the modulator.

For the data presented herein, the circuit was fabricated using a dual stripe waveguide geometry embedded in a silica cladding (see https://www.lionix-international.com/photonics/mpw-services/for details of waveguide geometry). The waveguides were optimized to allow for optimal guiding around 1550 nm with bend radii as tight as 100 µm without substantial losses. To improve coupling to optical fibers spot size converters were used at the edges of the chip. These consisted of tapers which would expand the mode to ~10 µm around 1550 nm. After the devices were fabricated they were diced, polished and packaged to simplify testing. This included bonding a 48-fiber v groove array to one face of the chip. The fiber used for the v groove was SMF28. All inputs and outputs to and from the various devices were accessed through this v-groove. The circuit was mounted onto a PCB and the DC and ground lines connected so they could be accessed via ribbon cables from the top and bottom of the device. The entire assembly was mounted on a sub-mount that included a thermo-electric cooler (which was not utilized for these experiments). An image of the packaged device in the measurement setup is shown in FIG. 6.

The device was designed using Nazca Design (https://nazca-design.org/) with the elements as described above. In addition to the device, several test structures and circuit elements were also designed to individually characterize the performance of each component Example Simulated Performance (a) AWG The theoretical transmission spectra of the AWG as well as the back-to-back AWGs (dispersor and recombiner separated by a modulator) are shown in FIG. 7A and FIG. 7B respectively. It can be seen that the designed AWG produces Gaussian-shaped spectral channels with ~20 nm wide 3 dB bandwidths, spaced ~20 nm apart as required, with no visible side lobes within 25 dB of the peak of each channel. The AWG exhibits an insertion loss of ~3.5 dB at 1600 nm which increases to almost 6 dBs at 1400 nm. This roll off in the efficiency of the AWG towards the edges of the free spectral range is a property of the AWG and is related to the far-field illumination of the beams from the waveguides at the output of the array on the output facet of the free propagation zone. The red curve highlights the cumulative transmission spectrum (i.e. if all channels were summed, as they will be once the light passes through a second stage AWG). The red curve clearly exhibits a ripple which is called spectral dropout and is due to the discretization of the spectrum into waveguides at the output of the device, and some light being lost between them.

When two AWGs are used back-to-back, the losses and spectral drop out double. The theoretical minimum loss of the back-to-back device ranges from 7 dB to 11 dB while the spectral ripple has an amplitude of ~1 dB. These losses are acceptable when it comes to flattening an LFC given the brightness of the source to start with. For other applications that require lower losses, they can be reduced by using lower index platforms like silica-on-silicon, and/or optimizing for a narrower overall wavelength range. Note: The simulation is of only the 2 AWGs operating back to back and does not include losses from any of the other hardware. It also does not include any phase errors (assumed to be zero).

Figure 7C:
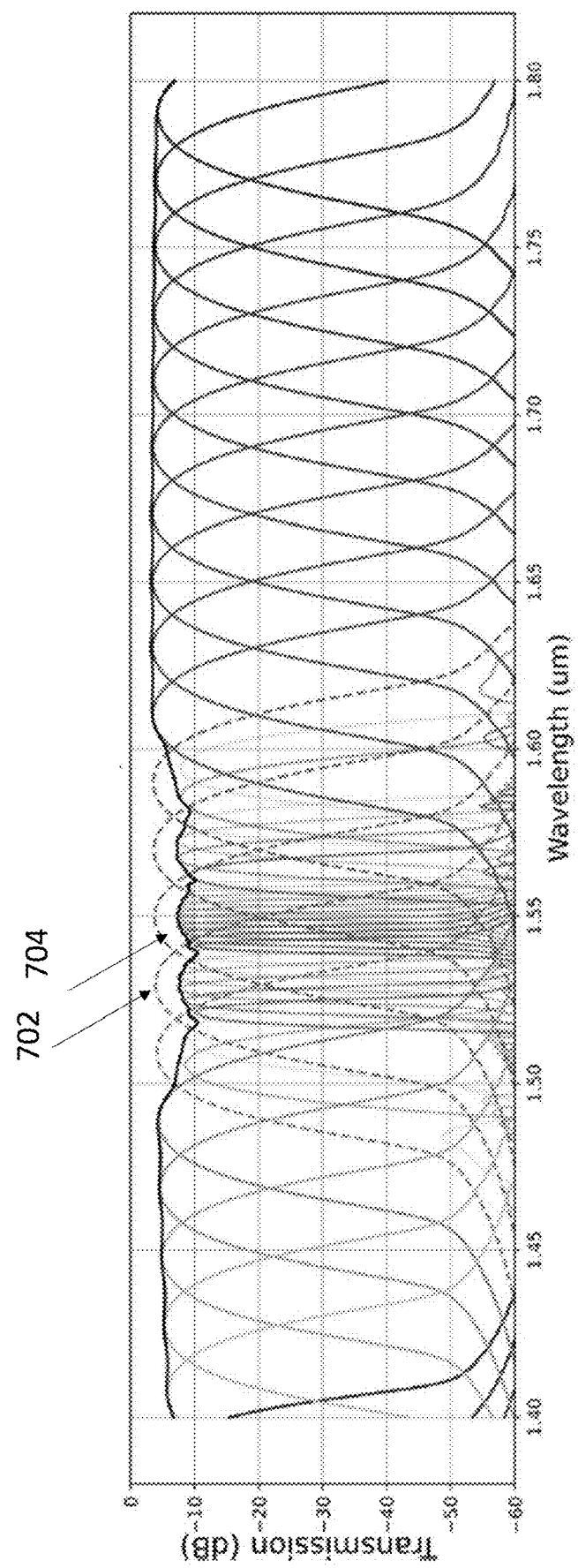

FIG. 7C is a simulated spectrum for a cascaded device based on SiN waveguides and having the architecture in FIG. 5B. (schematic and simulations carried out by BRIGHT Photonics Inc.). FIG. 7C shows how, for a subset of the subbands comprising region(s) 702 of the spectral intensity profile 704 varying over a spectral scale smaller than the subbands, the subbands are smaller (i.e., have a smaller range of wavelengths), and/or the number of the spectral channels 704, 534 transmitting the subset of the subbands is increased, so that the regions of the spectral intensity profile are modulated with higher resolution.

(b) MZIs

Figures 8A, 8B:
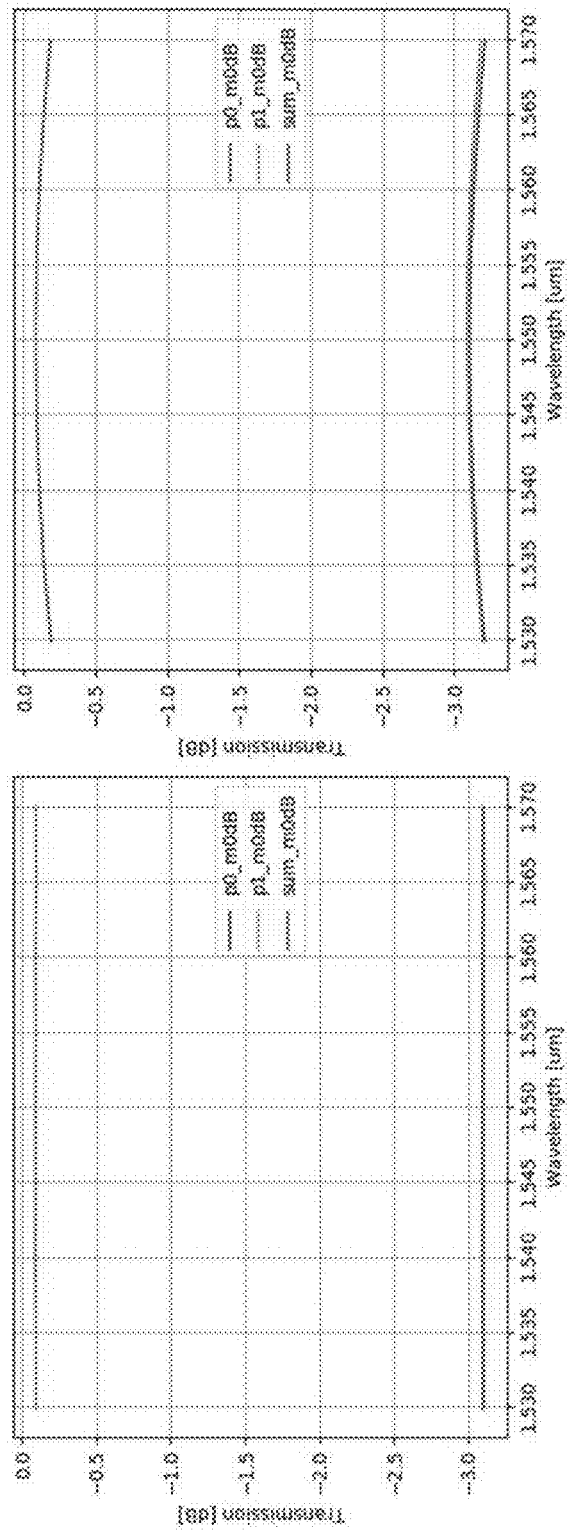
FIGS. 8A-8B. Theoretical transmission spectra of the 1×2 (FIG. 8A) and the 2×2 (FIG. 8B) multimode interference couplers. The spectra include the power delivered to each output port along with the total power in the two ports normalized by the input power. At the output of the 2×2 multimode interference coupler the drop port is routed to point away from the rest of the device.

Between the two AWGs are the MZIs and TOPMs. The MZIs consist of a 1×2 multimode interference coupler, which first splits the light and then a 2×2 multimode interference coupler that recombines the signals. Both multimode interference couplers were designed to split the light 50:50 across the bandwidth of each channel and were therefore optimized for a 40 nm bandwidth to be conservative. The theoretical transmission profiles of the multimode interference couplers, for the 1550 nm channel can be seen in FIG. 8. It can be seen that the splitting ratio for both multimode interference couplers is even amongst the output ports across the entire spectrum. In addition, the multimode interference couplers achieve an insertion loss of ~ 0.1 dB at the center of the channel and exhibit very little additional losses away from the center wavelength only in the case of the 2×2 variant. Therefore, we can assume that the MZI will introduce an additional 0.2 dB of loss at minimum. A 2×2 multimode interference coupler was chosen at the output of the MZI because a 2×1 would result in the rejected light being radiated into the cladding in an uncontrollable way. A 2×2 multimode interference coupler on the other hand allows us to control what happens to the rejected light. We opted to fold the drop port waveguide away from the rest of the structure and terminate it so that the field would radiate away in a controlled manner, minimizing the chance for stray light effects or reflections.

To modulate the MZI and adjust the transmitted power, a TOPM was placed in one arm of the interferometer. Other technologies could be considered for this as well [16]. The static path lengths of the arms of the MZI were set such that they were out of phase by ~π/3 radians or 60°. The motivation for this was that then full transmission would occur with only π/3 radians tuning with the TOPM and the minimum transmission point would occur with a further π radians applied.

(b) TOPM

Thermo-Optic Phase Modulators follow each of the MZIs to adjust the relative phase of the spectral channels so the spectrum can be recombined as desired. The phase shift is achieved by applying heat to the waveguide region, which modifies the local index via the thermo-optic effect. The phase shift will be different for different wavelengths. However, over the narrow bands of the channels of the AWG (~1% fractional bandwidth channels), the phase shifts are effectively achromatic.

The TOPMs consist of a chromium electrode deposited onto the top cladding layer above a given waveguide that has a current driven through it. To localize heating to where it is desired the electrodes are made to be wide while routing across the PIC and only narrowed over the top of the waveguide, which increases the resistance (to 500-to 600 ohms) and creates localized heating. The heated regions were 1.9 mm long, which allowed for many π radians of phase adjustment. The PIC was laid out in such a way as to keep thermal cross-coupling between any two waveguides to <17 dB. The TOPMs are extremely fast with a switching time of the order of 1 ms as reported by the fabrication foundry used, LioniX International.

Other material platforms such as silica-on-silicon or ion-exchanged waveguides could be considered. While the lower index contrast of these platforms would result in larger devices, they offer better mode matching to fibers and in the case of ion-exchanged waveguides offer better transparency beyond 2.2 microns, where SiN starts to become opaque.

Example Apparatus for Testing or Utilizing the Devices of FIG. 5A

To test the devices the setup shown in FIG. 6 was used (architecture of FIG. 5A). Initial testing was conducted by injecting light from a super-luminescent diode (Thorlabs, S5FC1550P-A2). Since the fibers bonded to the device under test were SMF28, we used a paddle wheel polarization controller (Thorlabs, FPC561) to orient the polarized signal of the source with the TE mode of the waveguides on the chip, as the waveguides were highly polarization dependent and lossy for TM. Note, polarization controllers are chromatic devices which means the polarization could only really be optimized for one wavelength, in our case around 1550 nm, and at wavelengths >50 nm away from this wavelength, there will be polarization cross-talk. The output was connected directly to an optical spectrum analyzer (OSA, Thorlabs, OSA202C). In typical applications, a polarization maintaining fiber would be used and a polarization controller would not be required.

To test each device, the output of the polarization controller was connected to a given device, the output of that device to the OSA, and then the polarization controller was adjusted to maximize the signal on the OSA. This ensured that the polarization of the light source was aligned with the TE mode of the waveguides, which was most efficient.

To control the TOPMs we used a multi-channel controller 600. Since the full device consisted of 20 MZIs and 20 TOPMs, the driver had to support no less than 40 active channels simultaneously. To achieve a maximum of 3π phase shifts, we required a driver capable of up to 20 V and 50 mA per line. For this reason we used a multi-channel (120) driver from Nicslab (XPOW-120AXCCvCV-U). A linear power supply was used to power the multi-channel controller and a computer to operate it. To connect the relevant pins of the controller to the PCB and hence the device under test, we used an electrical breadboard (Nicslab, M6 multiconnector).

Once testing with the super-luminescent diode 602 was completed, we undertook tests with an LFC. However, the comb we had access to was pre-broadened, which meant that it had a triangular shaped spectral profile, not representative of full broadened combs, which are typically flatter, and was only several hundred nanometers wide. Data were acquired with the OSA slit width set to 2 nm resolution, where the lines of the comb were not separated as well as with 0.05 nm resolution where they were.

Figures 9A, 9B:
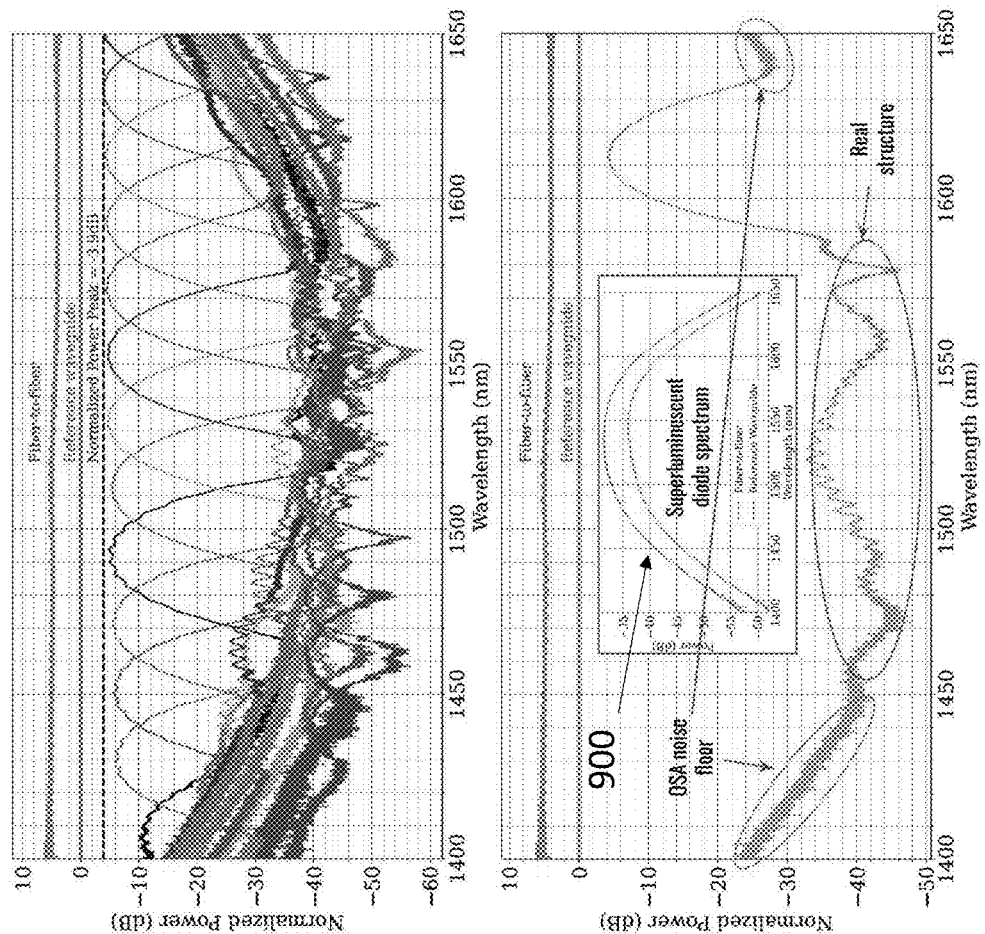
FIGS. 9A-9B.

The super-luminescent diode had sufficient flux to test the device down to 1400 nm and up to 1650 nm (see inset of bottom panel of FIG. 9 for the profile of the light source). The OSA limited testing at the long wavelength end to 1700 nm, but there is no reason to suspect the devices perform any differently to the data we present in the 1400 to 1700 nm range.

Example Experimental Results for Device of FIG. 5A

Using the methods described in the previous section, the spectral response of the single AWG of FIG. 5A was first probed and the results are shown in FIG. 9. To generate the spectrum shown, the super-luminescent diode was injected into the input waveguide, and an output waveguide was connected to the OSA, and the response function recorded. We then stepped through all output waveguides systematically recording the response functions. All spectra were normalized to the loop back or reference waveguide, to remove the effect of coupling to and from the device to isolate the losses of the component in question. Since the super-luminescent diode has a bell shaped spectral profile 900, normalizing all spectra to that corrects for the shape, but imposes a parabolic-like noise floor, as seen in FIG. 9.

The figure shows cleanly defined Gaussian shaped transmission functions for each channel, which have 3 dB bandwidths of ~20 nm and are spaced by ~20 nm, consistent with the design requirements. The channel crossing-points (where the power in neighboring channels is equal), is consistent with the 3 dB bandwidth as designed. The side lobes are >20 dB below the channel peaks as seen in the bottom panel, indicating very low levels of manufacturing errors in the AWGs [17]. The lowest loss of ~3.9 dB is achieved between 1600 to 1650 nm. This value is consistent with the theoretical value (−3.5 dB). The losses of the AWG increase below 1530 nm to about −6 dB at 1430 nm, also consistent with expectation.

Also shown in the FIG. 9 is the fiber-to-fiber throughput (blue trace). This was taken by connecting the output of the polarization controller directly to the OSA. This removes the entire PIC and by comparing the blue line to the pink line for the reference waveguide we can infer the losses from coupling from fibers in the array to and from the SiN waveguides. The minimum losses are seen around 1600 to 1650 nm and are as low as 4 dB. The loss profile is relatively flat but slowly increases to about 5 dB at 1400 nm. Since the propagation and bend losses in SiN waveguides are very low, and the reference guide length is short, we can assume that the majority of these losses are attributed to coupling to and from the chip. This implies a fiber/waveguide coupling loss of 2 to 2.25 dB per facet over the 1400-1650 nm spectral range. With further effort in engineering the spot size converters we believe this can be reduced.

Figure 10:
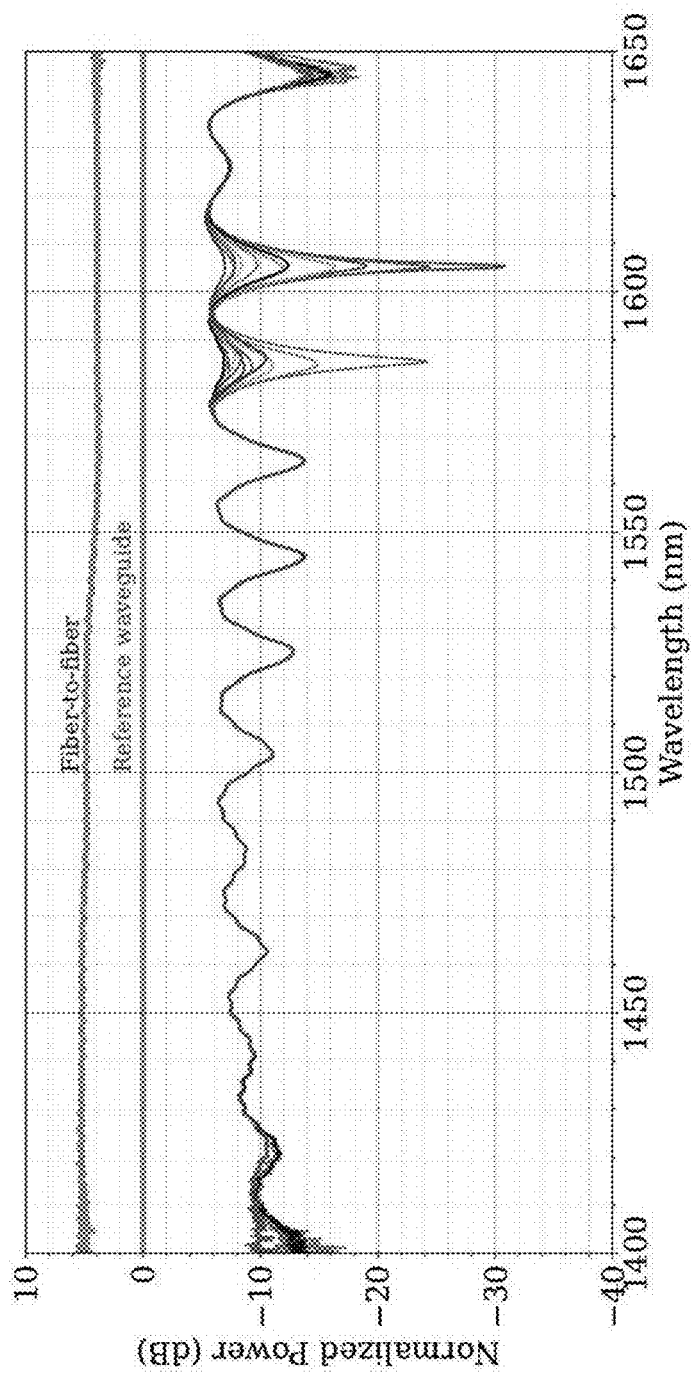
FIG. 10. Spectral response of the back-to-back AWG device. The 1590 nm channel TOPM has been modulated to show how it can be used to control the amplitude between neighboring channels. The data were normalized to the reference waveguide/loop back. This process removes the contribution of coupling losses to/from the chip leaving only the losses of the component/device.

FIG. 10 shows the transmission function of the back-to-back AWG device. The spectrum was once again normalized to the reference waveguide. The minimum loss (−6 dB) occurs between 1600 and 1650 nm, which is consistent with simulation to within 1 dB. The losses at the shorter wavelengths increase to ~10 dB at 1410 nm, again consistent to within 1 dB of simulations.

The ripple in the spectrum, due to spectral dropout from the AWGs is evident. The amplitude of the ripple varies between 2 dBs, that which is expected from the models, up to 7 to 8 dBs. This larger than expected dropout is due to the relative phasing of neighboring channels at the time the spectrum is recombined at the second AWG. This means that the static path length compensation implemented in the chip through waveguide routing was imperfect, and the TOPMs had to be used to compensate for the imperfection.

FIG. 10 also shows the 1590 nm TOPM being modulated. It can be seen that two regions of the spectrum, on either side of 1590 nm are modulated. This is because only the spectral regions of overlap between neighboring channels are affected when you modulate the phase in the channel. This "fang" like spectral response is characteristic of the effect of TOPM modulation in this architecture. It can also be seen that the modulation is unbalanced, i.e. it goes up in one fang while going down in the other (look at the red trace in both fangs to see this), which is a result of the fact the three spectral channels (1570, 1590 and 1610 nm) are not in phase. Once phase matching has been achieved, the fang-like spectral response will modulate both fangs symmetrically. The amplitude of the modulation arising from the TOPMs is >20 dBs.

Figures 11A, 11B:
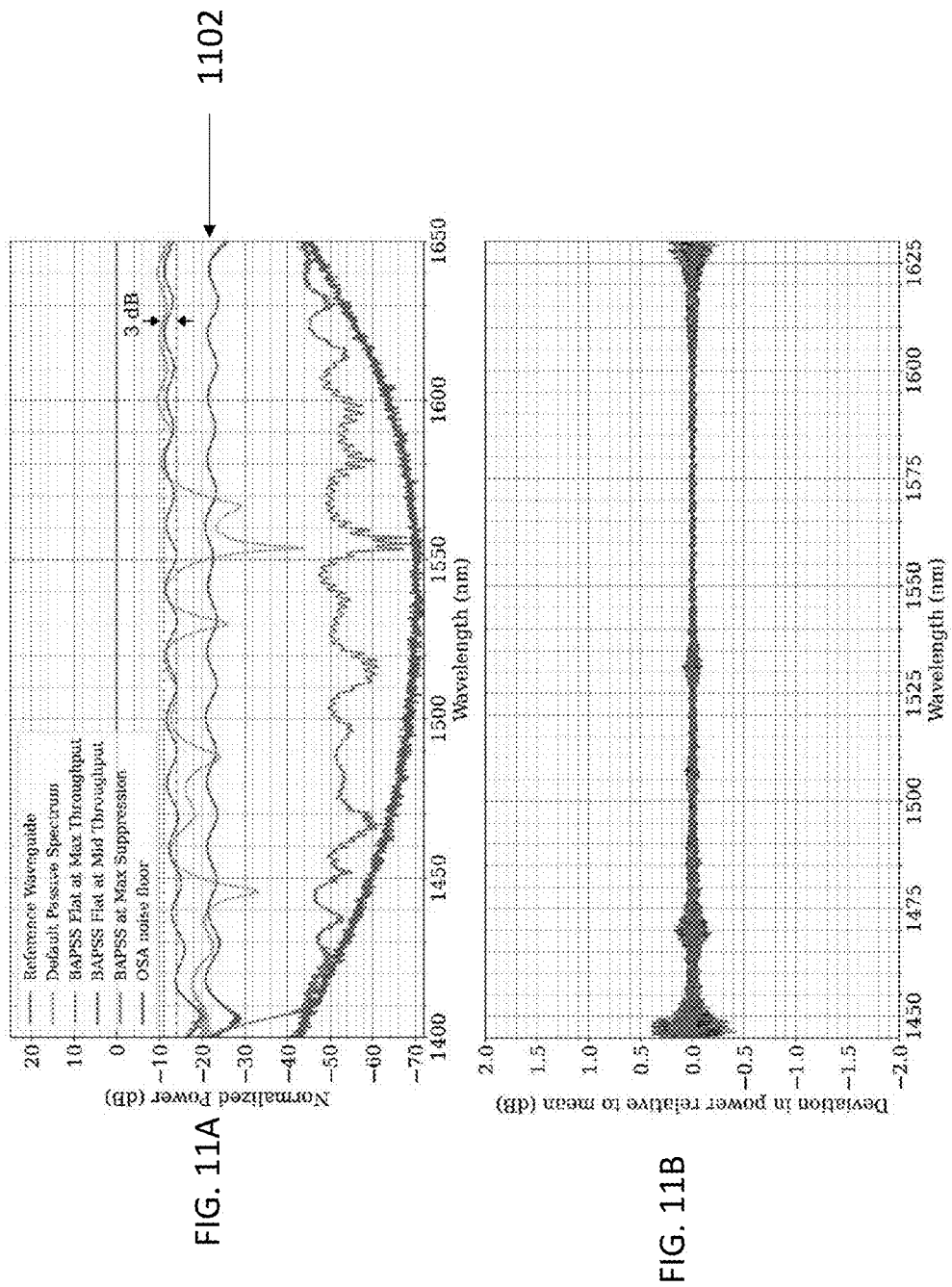
FIGS. 11A-11B.

The first two devices have validated that the key building-block components (AWGs, path length matched waveguides) match their expected performance. The next step was to test the entire spectral shaping device. Light was injected into the input of the full BAPSS device and the output routed to the OSA. The results are shown in FIG. 11. Spectra were taken with the MZI's and TOPM's turned off (orange) as well as turned on and adjusted for maximum throughput while maintaining flatness (green), minimum throughput (purple) and some arbitrary flat level in between (red) and are shown in the top panel. The minimum losses occur between 1600 to 1650 nm, and are as low as 9.5 dBs. The minimum theoretical losses of the AWG and MZI amount to 7.2 to 7.5 dB. In addition, the approximate path length through the device is 6 to 7 cm and therefore the propagation losses accumulate and add a further 1 to 3 dB which accounts for the remainder of the loss measured. The spectral ripple on the various flat states (green and red) have an amplitude of 2 to 3 dB, which is consistent with what we would expect from the back-to-back AWG. The approximate difference between the maximum and minimum throughput states is 38 dB. The short and long wavelength ends of the minimum throughput spectrum (purple) were impacted by the noise floor of the OSA (brown trace).

The stability of the full BAPSS device was tested (FIG. 11). The BAPSS was set for maximum throughput while maintaining a high degree of flatness (green trace), and the OSA set to record data every 5 minutes for nearly 12 hrs. Note, that the TEC was not used to stabilize the PIC in these results.

FIG. 12 shows the results of testing using the LFC as a source. The top left panel shows the LFC spectrum 1200 through the reference waveguide (blue) as well as the BAPSS device (orange, green, red and purple). It can be seen that the LFC spectrum is triangular in shape on a logarithmic scale, due to the pre-broadened nature of the output of the LFC. There is a large dip in the region around 1560 nm because a fiber Bragg grating (FBG) was used to suppress the pump region. The grating was not optimized for the spectral profile or the amplitude of the pump for these tests and so unfortunately offered more suppression over a larger bandwidth than necessary to flatten the spectrum in that region.

The orange trace shows the same spectrum through the BAPSS device, with the device set to maximum throughput. The green and red traces show the spectrum flattened at the −50 and −60 dBm levels. The flattening was done manually by eye. The blue shaded boxes are 5 dB high, showing flattening of the spectrum to within 5 dBs, across hundreds of nanometers of range as was the case with the super-luminescent diode tests, except for the region around the pump, which has a series of sharp spectral features too narrow for the device to control with the channel spacing used. The purple trace shows how much of the LFC spectrum could be suppressed if we put the device into the minimum transmission state. The brown trace is the noise floor of the OSA indicating that in large sections of the spectrum we are limited by the OSA. To re-enforce the capabilities of the MZIs and TOPMs, we show some difference spectra in the bottom row of the figure. These spectra represent the difference between the maximum throughput state and the maximum throughput state with several MZI's (FIG. 12E) and TOPMs (FIG. 12F) adjusted for minimum transmission. Once again the MZIs easily exceed 40 dBs of suppression and the TOPMs reach the 20 dB level, consistent with the tests conducted with the super-luminescent diode.

Figures 12A, 12B:
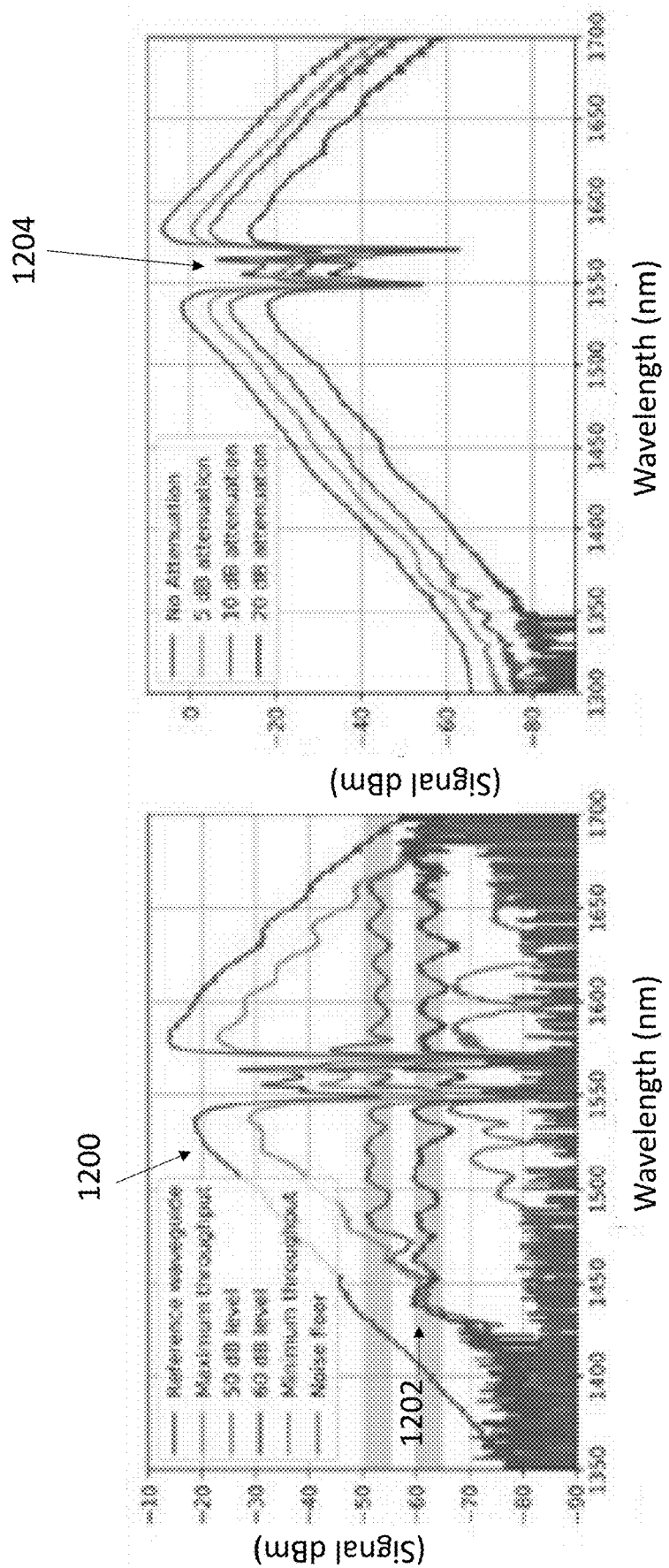
FIGS. 12A-12F. Spectral response of the full device with an LFC.
Figures 12C, 12D:
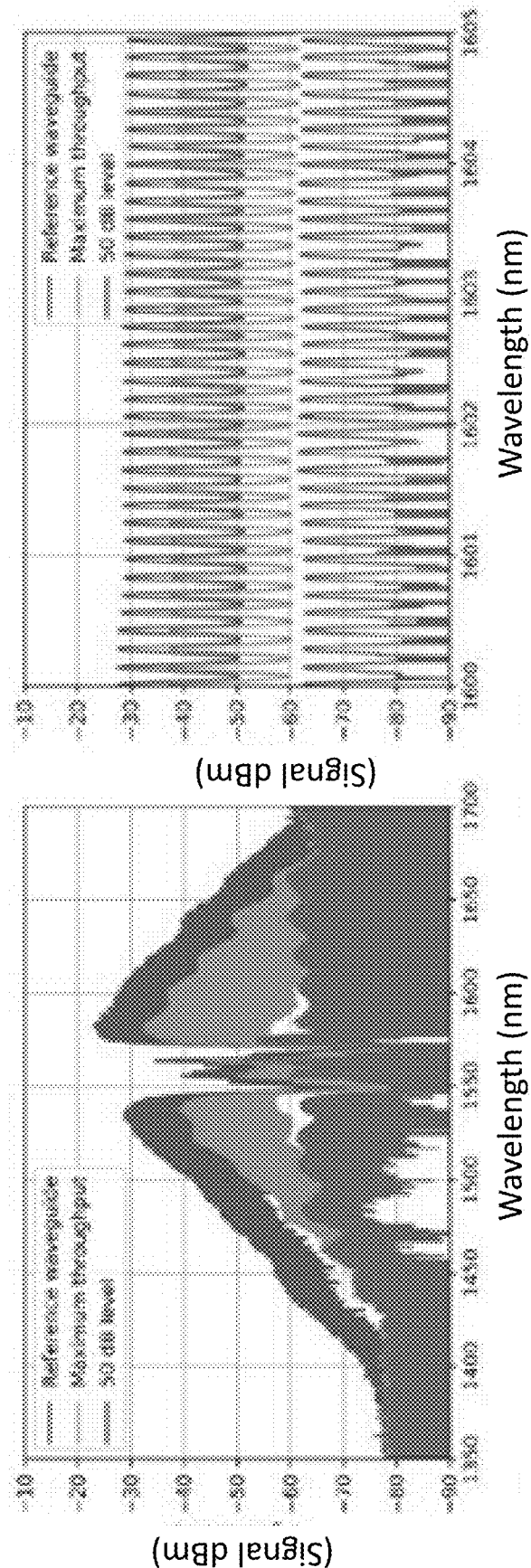
Figure 12F:
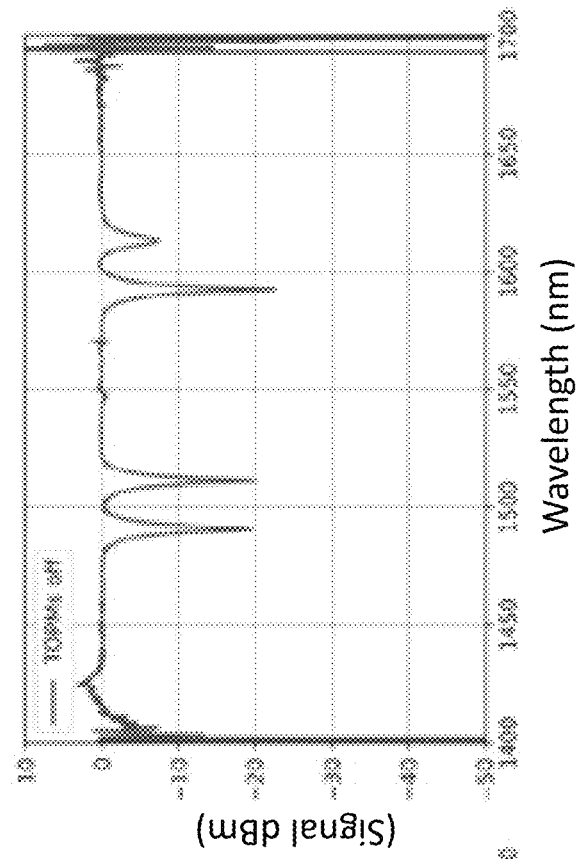
Figure 12E:
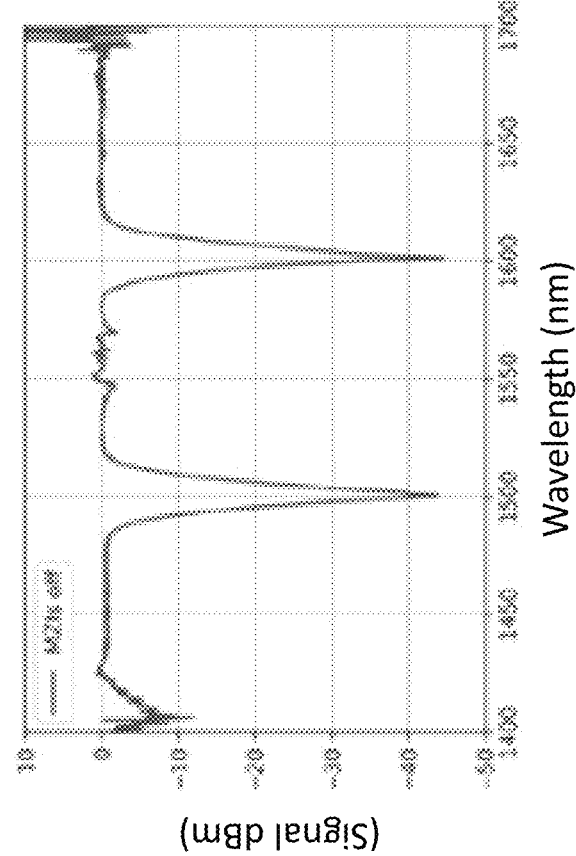

Data were also acquired with OSA resolutions of 0.05 nm where the comb lines were separated, as shown in FIGS. 12C-12D. The panel in FIG. 12C looks similar to the low resolution scan in FIG. 12A, except that the traces are no longer lines, but rather shaded regions. This is because in the high resolution mode the modulation in the spectrum due to individual comb lines can be seen. The panel in FIG. 12D shows the same spectrum but zoomed into only a 2 nm segment around 1600 nm. The lines are clearly separable in this plot. The results at high resolution were deemed to be consistent with the lower resolution data presented here.

Also tested was the power handling capabilities of the device. To ensure no damage the device, we connected the LFC to the reference waveguide and took a spectrum. We then replaced the 20 dB attenuator, used in all LFC experiemnts till this point, with a 10 and 5 dB version and finally removed the attenuator altogether. The spectra are shown in FIG. 12A. The spectra are largely identical, and are simply offset vertically by the amount corresponding to the attenuation factor. We measured the total integrated power injected into the device with the 20 dB attenuator to be 3 to 4 mW. As we could not directly measure the power with no attenuator, we can infer it would be a 20 dB brighter signal that is achromatic (all traces are parallel to one another) and therefore assume that in the full power mode, 300 to 400 mW of power were being injected into the full device.

After confirming there were no deleterious effects with these levels of power on the reference waveguide, we connected the LFC to the BAPSS device without any attenuation and conducted some basic tests. The BAPSS device performed identically to how it had with reduced power.

Parallel Devices

With the maximum bandwidth of a single device established, several devices could be combined in parallel to span the full wavelength range of the input electromagnetic radiation. These solutions may implement broadband beamsplitters, ideally based on photonics or highly miniaturized technologies.

Closed Loop Control

Closed-loop control of these devices may be implemented utilizing a separate monitoring spectrometer. One possible implementation is to use the TOPMs to phase all channels in the array, and then keep them fixed and only drive the MZIs. This reduces the degrees of freedom dramatically and simplifies the problem to that akin to SLM based versions. To generate the signal used to drive the tracking loop however, the OSA may be substituted with the actual spectrograph used for the application. This has the advantage of allowing the BAPSS to be used to compensate for any other wavelength dependent loss differences between the BAPSS and the spectrograph.

In some applications this may be impractical because 1) the timescales of changes are faster than typical readout times used for spectra acquisition and 2) the data would need to be extracted in real time, which may not be feasible. Therefore, in some implementations, the baseline approach could be to split off a portion of the signal at the output of the BAPSS and send it to a small dedicated portable spectrometer. Another alternative would be to integrate photodetectors directly onto the PIC, or use a flip chip design, where the photodetectors could be used to sense either the rejected signal from the 2×2 multimode interference couplers or some signal tapped after the TOPM in each channel. Such an approach would offer a miniature and portable solution to spectral shaping.

Device Embodiments

Example devices according to embodiments describe herein include, but are not limited to, the following (referring also to FIGS. 1-12).

1. A device 500 useful as an arbitrary spectral shaper. The device comprises a photonic integrated circuit 501 comprising:
    an input 502 for receiving input electromagnetic radiation 504 having a bandwidth greater than 60 nm; a spectral splitter 506 connected to the input, the spectral splitter splitting the electromagnetic radiation into a plurality of spectral channels 508 (each comprising an electric or electromagnetic field) and each transmitting a different subband of the bandwidth, wherein at least one of the following: the bandwidth, a spectral spacing of the spectral channels, the subband, or a number of the spectral channels is adjusted as a function of the spectral intensity profile 900, 1200 (see e.g., FIG. 9, FIG. 12) of the input electromagnetic radiation and a desired output spectral intensity profile 1102, 1202.
    a modulator 510, connected to the spectral splitter, for modulating an amplitude and a phase of (the electric or electromagnetic field in/of) one or more of the spectral channels so as to form modulated outputs 512, wherein the modulator further comprises drop ports 514 redirecting rejected portions of the electromagnetic radiation away from the photonic integrated circuit 501 so as to suppress noise; and
    a spectral recombiner 516, connected to the output of the modulator, for combining the modulated outputs into a single output port 518 outputting output electromagnetic radiation 520 having the desired output spectral intensity profile 1102, 1202 shaped by and synthesized from the modulated outputs 512.

2. The device of example 1, wherein the photonic integrated circuit is formed on a single substrate or chip, or multiple substrates or chips.

3. The device of example 1 or 2, wherein:
    the spectral splitter and the recombiner each comprise grating (e.g., array waveguide gratings AWG or photonic echelle gratings) each having an output 550, and
    the modulator comprises:
    a plurality of variable optical attenuators (VOAs) for modulating the amplitude, the variable optical attenuators each connected to a different one of the outputs 550 of the spectral splitter and having a plurality of output ports 552 and the drop ports 514; and
    a plurality of phase modulators 526 connected to the variable optical attenuators, and
    each of the phase modulators connected to a different one of the variable optical attenuators.

4. The circuit of example 1, wherein:
    the modulator comprises an amplitude controller 510 attenuating the amplitude of one or more of the spectral channels so as to form a plurality of attenuated spectral channels; and
    the modulator further comprises a phase controller 526 connected to the amplitude controller 510, wherein the phase controller shifts the phase of one or more of the spectral channels 508 so as to form the modulated outputs 512 each having their optical path lengths appropriately adjusted for the combining in the recombiner 516.

5. The device of example 1, wherein, for a subset of the subbands comprising region(s) 1204, 702 of the spectral intensity profile 900, 1200 varying over a spectral scale (range of wavelengths) smaller than the subbands:
    the subbands are smaller (i.e., have a smaller range of wavelengths), and/or
    the number of the spectral channels 508, 534 transmitting the subset of the subbands is increased,
    so that the regions of the spectral intensity profile are modulated with higher resolution.

6. The device of example 1, wherein the modulator comprises:
    an amplitude controller 510 comprising one or more interferometers (e.g, MZI) comprising coupled pairs of waveguides 522a, 522b, or
    a nonlinear crystal (e.g., lithium niobate) modulator modulating the amplitude using an electrooptic or piezo-switching effect.

7. The device of example 6, wherein:
    the amplitude controller comprises a plurality of electrodes 524, and each of the electrodes are coupled to the nonlinear crystal or one of the waveguides 522b in each of the pairs.

8. The circuit of example 7, wherein the electrodes 524 are thermally or electrically coupled to the waveguides 522b so as to modulate phase, and thereby the amplitude transmitted by the amplitude modulator, in response to resistive heating, piezoelectric actuation, or electro-optic actuation of the electrodes controlled by control signals applied to the electrodes.

9. The device of example 8, further comprising a driving circuit 600 coupled to the electrodes 524, the driving circuit outputting the control signals controlling the modulation of the amplitude and/or the phase of one or more of the spectral channels 508 so as to form the desired output spectral intensity profile 1202, 1102.

10. The device of example 9, further comprising:
a spectrum analyzer (OSA) for measuring a frequency spectrum of the output electromagnetic radiation 520; and
a computer or control circuit 602 coupled to the driving circuit and the spectrum analyzer, the control circuit determining the control signals from feedback comprising the frequency spectrum.
11. The device of any of the examples, wherein the input electromagnetic radiation comprises a plurality of wavelengths between 380-2500 nm (e.g., the bandwidth is in a range 60 nm-2500 nm) and the spectral channels each transmit the subband having a wavelength spread in a range of 0.5 nm-100 nm or 20 nm-100 nm.
12. The device of example 11, wherein the number of the spectral channels, the subband of each spectral channel, and the spacing between the spectral channels, are adjusted such that the output power of the output electromagnetic radiation varies across its entire bandwidth by less than 5 dB.
13. The device of example 3, wherein each of the VOAs comprise a Mach Zehnder interferometer (MZI):
splitting the spectral channel 508 received in the interferometer into a first component 522a and a second component 522b phase shifted relative to the first component; and
interfering the first and second components so as to attenuate an intensity of the spectral channel.
15. The device of example 14, wherein the interferometer comprises a first arm 522a coupled to a second arm 522b, the first arm is coupled to an electrode for modulating a phase of the first component transmitted in the first arm relative to the second component transmitted in the second arm.
16. The device of example 15, wherein the dispersor 506 or splitter and the combiner 516 each comprise an arrayed waveguide gratings or echelle gratings.
17. A system 601 comprising:
a laser frequency comb (LFC), a laser 604, or a communications network, or a spectrometer 606 coupled to the device of any of the examples, wherein system transmits the input electromagnetic radiation 504 to the input 502 and/or receives the output electromagnetic radiation 520 from the single output port 518.
18. An arbitrary pulse shaper comprising the device of any of the examples 1-17.
19. An arbitrary spectral shaper comprising the device of any of the examples 1-17 (e.g., the device can form any desired or predetermined spectral shape).
20. An arbitrary waveform generator comprising the device of any of the examples 1-17.
21. A gain flattening filter comprising the device of any of the examples 1-17.
22. An optical switch comprising the device of any of the examples 1-17.
23. The system of claim 17, wherein the system comprises the spectrometer and the output electromagnetic radiation has the desired output spectral intensity profile tailored for an interaction with a pre-determined molecular species.
21. The device of any of the examples, wherein the spectral channels comprise cascaded spectral channels wherein a plurality of the spectral channels 508 are further split into an additional stage 530 of sub-channels 534 comprising narrower subbands and each having their amplitude and their phase individually modulated by the modulator.
22. The device of any of the examples, wherein the drop ports 514 couple the rejected portions of the electromagnetic radiation 504 to a spectrum analyzer OSA for measurement of the frequency spectrum of the desired output spectral intensity profile.
23. A system comprising the device of any of the examples, further comprising:
a client instrument coupled to the modulator, so that an output from the client instrument may be used to control the amplitude transmitted by the spectral channels, via the modulator;
a spectrograph 606 coupled to the single output port via a fiber, wherein the spectrograph measures the frequency spectrum of the desired output spectral intensity profile;
the drop ports 514 coupled to vertical or grating couplers transmitting the rejected light off the photonic integrated circuit to a detector,
a chip comprising the photonic integrated circuit, the photonic integrated circuit further comprising waveguides coupled to the drop ports and routed to an edge of the chip, for transmission of the rejected portions of the electromagnetic radiation off the chip; or
one or more photodetectors on the chip comprising the photonic integrated circuit, the photodetectors coupled to the photonic integrated circuit so as to detect the rejected portions of the electromagnetic radiation and/or the output electromagnetic radiation.
24. The device of any of the examples, wherein the phase and amplitude may be modulated across the entire range of 0-2 pi.

Advantages and Improvements

The results above demonstrate that the device outlined works extremely well for spectral shaping/flattening. Specifically, the device was shown to operate across 250 nm of spectral range, the largest demonstrated from such a layout, with losses consistent with theory. The MZIs were capable of modulating a single spectral channel by 40 dBs, which indicates that the amplitude in the arms of the interferometer is very well balanced, ruling out large manufacturing imperfections. In addition, this modulation range exceeds nearly all bulk optic flatteners which rely on spatial light modulators, which are typically limited to 20 to 30 dBs only.

Specifically, the device characterized by the results is optimized to operate over a broad wavelength range (400 nm), with coarse spectral channels (20 nm full width at half maximum), with very high dynamic range (>30 dB) and low insertion loss. The channel spacing was chosen to match the bandwidth over which the LFC amplitude changes in unison, in addition to reducing the overall number of channels. This development also leveraged significant advances in commercial lithographic fabrication techniques over the last few decades. Indeed, SiN fabrication via multi-project wafer runs are now producing low loss (<0.5 dB/cm and 0.2 dB/cm more typically at 1550 nm propagation loss) waveguides and devices that are highly reproducible.

The BAPSS flattened a pre-broadened LFC spectrum to a 5 dB amplitude range despite using a chromatic polarization controller. In addition, the LFC polarization was filtered with an off-the-shelf inline polarization filter (Thorlabs, PFC1550A), before injecting it into the BAPSS device, which was also not designed for broad bandwidths. Therefore, the polarization state of the LFC spectrum may not have been perfectly linear and aligned with the TE axis of the waveguides at wavelengths >50 nm from the optimized wavelength (1550 nm) but have no estimate of how imperfect it was. By using bulk optic polarizers to clean up the output of the LFC and PM fibers to deliver the light, the flattening performance should be improved over broader bandwidths.

The TOPMs offer an extra layer of control that is not present in bulk optic flatteners: the relative phasing between the channels. This produces a distinct "fang-like" spectral response, that is helpful for understanding the relative phase between neighboring channels.

The circuit demonstrated here is actually designed for two purposes: static compensation of the native LFC spectrum as well as for tracking the dynamic aspects. It should be noted that around the pump region of an LFC there can be sharp features (as seen in FIG. 12), which may require a photonic device with much narrower channels. Another manufactured device occupies a PIC of 32×16 mm$^2$, has channels with bandwidths ranging from 2 to 20 nm, and supports 39 channels across 1400 to 1800 nm.

Going beyond this size and number of channels is possible with customization in several areas: custom lithographic runs with larger reticles and custom PCBs and electronics drivers to support more channels. Regardless, custom FBGs may be used to compensate for the sharp static aspects of the spectrum, offloading such processing from the flattener, leaving the flattener to work on the broader parts of the spectrum. If however one wishes to do all of this in the flattener itself, it is possible to use a cascaded AWG approach (as illustrated in FIG. 5B) whereby certain low resolution spectral channels are sent to higher resolution second stage AWGs that provide the sampling needed, but only in a limited number of channels.

The device can be used to track dynamic changes to the spectrum, e.g. so as to correct the slow changes expected in an LFC spectrum: with a modulation amplitude of up to 40 dBs and thermal response time as stated by the vendor (and confirmed in [18]) of 1 ms it will be sufficient to correct for the slow evolving, low amplitude changes typical of LFC spectra.

The results presented herein demonstrated successful operation of the BAPSS over a single band (1490 to 1800 nm). In one or more examples, the device may be re-engineered to increase the bandwidth to capture several bands and/or split the light at the output of the LFC and send it to several devices each optimized for operation in a different band.

REFERENCES

The following references are incorporated by reference herein.
1. T. Kurokawa, H. Takenouchi, and H. Tsuda, "Time-space-conversion optical signal processing using arrayedwaveguide grating," in Technical Digest. CLEO/Pacific Rim '99. Pacific Rim Conference on Lasers and Electro-Optics (Cat. No. 99TH8464), vol. 3 (1999), pp. 809-810 vol. 3.
2 D. Miyamoto, K. Mandai, T. Kurokawa, S. Takeda, T. Shioda, and H. Tsuda, "Waveform-controllable optical pulse generation using an optical pulse synthesizer," IEEE Photonics Technol. Lett. 18, 721-723 (2006).
3 A. M. Weiner, "Ultrafast optical pulse shaping: A tutorial review," Opt. Commun. 284, 3669-3692 (2011). Special Issue on Optical Pulse Shaping, Arbitrary Waveform Generation, and Pulse Characterization.
4 M. A. Roelens, J. A. Bolger, D. Williams, and B. J. Eggleton, "Multi-wavelength synchronous pulse burst generation with a wavelength selective switch," Opt. Express 16, 10152-10157 (2008).
5 S. Lewis, S. Chernikov, and J. Taylor, "Rayleigh noise suppression using a gain flattening filter in a broadband raman amplifier," in Optical Fiber Communication Conference. Technical Digest Post-conference Edition. Trends in Optics and Photonics Vol. 37 (IEEE Cat. No. 00CH37079), vol. 4 (2000), pp. 109-111 vol. 4.
. M. Harumoto, M. Shigehara, and H. Suganuma, "Gain-flattening filter using long-periodfiber gratings," J. Light. Technol. 20, 1027 (2002).
7 G. Baxter, S. Frisken, D. Abakoumov, H. Zhou, I. Clarke, A. Bartos, and S. Poole, "Highly programmable wavelength selective switch based on liquid crystal on silicon switching elements," in 2006 Optical Fiber Communication Conference and the National Fiber Optic Engineers Conference, (2006), pp. 3 pp.-.
8 P. Moroz, W. P. Klein, K. Akers, A. Vore, N. Kholmicheva, N. Razgoniaeva, D. Khon, S. A. Diaz, I. L. Medintz, and M. Zamkov, "Lifting the spectral crosstalk in multifluorophore assemblies," The J. Phys. Chem. C 121, 26226-26232 (2017).
9 R. A. Probst, T. Steinmetz, T. Wilken, G. K. L. Wong, H. Hundertmark, S. P. Stark, P. S. J. Russell, T. W. Hänsch, R. Holzwarth, and T. Udem, "Spectral flattening of supercontinua with a spatial light modulator," in Techniques and Instrumentation for Detection of Exoplanets VI, vol. 8864 S. Shaklan, ed., International Society for Optics and Photonics (SPIE, 2013), pp. 706-713.
10 D. A. Fischer, G. Anglada-Escude, P. Arriagada, R. V. Baluev, J. L. Bean, F. Bouchy, L. A. Buchhave, T. Carroll, A. Chakraborty, J. R. Crepp, R. I. Dawson, S. A. Diddams, X. Dumusque, J. D. Eastman, M. Endl, P. Figueira, E. B. Ford, D. Foreman-Mackey, P. Fournier, G. FUresz, B. S. Gaudi, P. C. Gregory, F. Grundahl, A. P. Hatzes, G. Hëbrard, E. Herrero, D. W. Hogg, A. W. Howard, J. A. Johnson, P. Jorden, C. A. Jurgenson, D. W. Latham, G. Laughlin, T. J. Loredo, C. Lovis, S. Mahadevan, T. M. McCracken, F. Pepe, M. Perez, D. F. Phillips, P. P. Plavchan, L. Prato, A. Quirrenbach, A. Reiners, P. Robertson, N. C. Santos, D. Sawyer, D. Segransan, A. Sozzetti, T. Steinmetz, A. Szentgyorgyi, S. Udry, J. A. Valenti, S. X. Wang, R. A. Wittenmyer, and J. T. Wright, "State of the field: Extreme precision radial velocities," Publ. Astron. Soc. Pac. 128, 066001 (2016).
11 R. K. Gibson, R. Oppenheimer, C. T. Matthews, and G. Vasisht, "Characterization of the C-RED 2: A High Frame Rate Near-Infrared Camera," arXiv e-prints arXiv: 1911.04567 (2019).
12 K. Takiguchi, T. Kominato, H. Takahashi, T. Shibata, and K. Okamoto, "Flexible pulse waveform generation using a silica waveguide based spectrum synthesis circuit," in Optical Fiber Communication Conference, (Optica Publishing Group, 2004), p. TuI5.
13 A. Leal-Junior, V. Campos, A. Frizera, and C. Marques, "Low-cost and high-resolution pressure sensors using highly stretchable polymer optical fibers," Mater. Lett. 271, 127810 (2020).
14 C. Caucheteur, J. Villatoro, F. Liu, M. Loyez, T. Guo, and J. Albert, "Mode-division and spatial-division optical fiber sensors," Adv. Opt. Photon. 14, 1-86 (2022).
15 Z. Wang, R. Singh, C. Marques, R. Jha, B. Zhang, and S. Kumar, "Taper-in-taper fiber structure-based lspr sensor for alanine aminotransferase detection," Opt. Express 29, 43793-43810 (2021).
16 K. Xu, "Silicon electro-optic micro-modulator fabricated in standard CMOS technology as components for all silicon monolithic integrated optoelectronic systems," J. Micromechanics Microengineering 31, 054001 (2021).

17 P. Gatkine, N. Jovanovic, C. Hopgood, S. Ellis, R. Broeke, K. Lawniczuk, J. Jewell, J. K. Wallace, and D. Mawet, "Potential of commercial SiN MPW platforms for developing mid/high-resolution integrated photonic spectrographs for astronomy," Appl. Opt. 60, D15 (2021).

18 N. Cvetojevic, F. Martinache, P. Chingaipe, R. Laugier, M. N'Diaye, R. Ligi, and D. Mary, "Closed-loop on-chip phase control and fringe tracking in photonic interferometers." in Optical and Infrared Interferometry and Imaging VIII, vol. 12183 (SPIE, 2022), p. 45.

19 E. A. Rank, R. Sentosa, D. J. Harper, M. Salas, A. Gaugutz, D. Seyringer, S. Nevlacsil, A. Maese-Novo, M. Eggeling, P. Muellner, R. Hainberger, M. Sagmeister, J. Kraft, R. A. Leitgeb, and W. Drexler, "Toward optical coherence tomography on a chip: in vivo three-dimensional human retinal imaging using photonic integrated circuit-based arrayed waveguide gratings," Light. Sci. & Appl. 10, 6 (2021).

20 Further information on one or more embodiments of the present invention can be found in "An all-photonic, dynamic device for flattening the spectrum of a laser frequency comb for precise calibration of radial velocity measurements. Nemanja Jovanovic, Pradip Gatkine, Boqiang Shen, Maodong Gao, Nick Cvetojevic, Katarzyna Lawniczuk, Ronald Broeke, Charles Beichman, Stephanie Leifer, Jeffrey Jewell, Gautam Vasisht, Dimitri Mawet. Proceedings Volume 12188, Advances in Optical and Mechanical Technologies for Telescopes and Instrumentation V; 121885D (2022) https://doi.org/10.1117/12.2630301

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A device useful as an arbitrary spectral shaper, comprising:
   a photonic integrated circuit, comprising:
      an input for receiving input electromagnetic radiation having a bandwidth greater than 60 nm;
      a spectral splitter connected to the input, the spectral splitter splitting the electromagnetic radiation into a plurality of spectral channels each transmitting a different subband of the bandwidth, wherein at least one of the following: the bandwidth,
   a spectral spacing of the spectral channels, the subband, or a number of the spectral channels is adjusted as a function of the spectral intensity profile of the input electromagnetic radiation and a desired output spectral intensity profile;
      a modulator, connected to the spectral splitter, for modulating an amplitude and a phase of one or more of the spectral channels so as to form modulated outputs, wherein the modulator further comprises drop ports redirecting rejected portions of the electromagnetic radiation away from the photonic integrated circuit so as to suppress noise; and
      a spectral recombiner, connected to the output of the modulator, for combining the modulated outputs into a single output port outputting output electromagnetic radiation having the desired output spectral intensity profile shaped by and synthesized from the modulated outputs.

2. The device of example 1, wherein the photonic integrated circuit is formed on a single substrate or chip, or multiple substrates or chips.

3. The device of claim 1, wherein:
   the spectral splitter and the recombiner each comprise a grating each having an output, and the modulator comprises:
      a plurality of variable optical attenuators for modulating the amplitude, the variable optical attenuators each connected to a different one of the outputs of the spectral splitter and having a plurality of output ports and the drop ports; and a plurality of phase modulators connected to the variable optical attenuators, and each of the phase modulators connected to a different one of the variable optical attenuators and downstream to a different one of the array waveguide gratings inputs in the recombiner.

4. The device of claim 1, wherein:
   the modulator comprises an amplitude controller attenuating the amplitude of one or more of the spectral channels so as to form a plurality of attenuated spectral channels; and
   the modulator further comprises a phase controller connected to the amplitude controller, wherein the phase controller shifts the phase of one or more of the spectral channels so as to form the modulated outputs each having their optical path lengths appropriately adjusted for the combining in the recombiner.

5. The device of claim 1, wherein, for a subset of the subbands comprising region(s) of the spectral intensity profile varying over a spectral scale smaller than the subbands:
   the subbands are smaller, and/or the number of the spectral channels transmitting the subset of the subbands is increased, so that the regions of the spectral intensity profile are modulated with higher resolution.

6. The device of claim 1, wherein the modulator comprises:
   an amplitude controller comprising one or more interferometers comprising coupled pairs of waveguides, or a nonlinear crystal modulator modulating the amplitude using an electrooptic or piezo-switching effect.

7. The device of claim 6, wherein:
   the amplitude controller comprises a plurality of electrodes, and each of the electrodes are coupled to the nonlinear crystal or one of the waveguides in each of the pairs.

8. The circuit of claim 7, wherein the electrodes are thermally or electrically coupled to the waveguides so as to modulate phase, and thereby the amplitude transmitted by the amplitude modulator, in response to resistive heating, piezoelectric actuation, or electro-optic actuation of the electrodes controlled by control signals applied to the electrodes.

9. The device of claim 8, further comprising a driving circuit coupled to the electrodes, the driving circuit outputting the control signals controlling the modulation of the amplitude and/or the phase of one or more of the spectral channels so as to form the desired output spectral intensity profile.

10. The device of claim 9, further comprising:
a spectrum analyzer for measuring a frequency spectrum of the output electromagnetic radiation; and
a computer or control circuit coupled to the driving circuit and the spectrum analyzer, the control circuit determining the control signals from feedback comprising the frequency spectrum.

11. The device of claim 1, wherein the input electromagnetic radiation comprises a plurality of wavelengths between 380-2500 nm and the spectral channels each transmit the subband having a wavelength spread in a range of 0.5 nm-100 nm.

12. The device of claim 11, wherein the number of the spectral channels, the subband of each spectral channel, and the spacing between the spectral channels, are adjusted such that the output power of the output electromagnetic radiation varies across its entire bandwidth by less than 5 dB.

13. The device of claim 3, wherein the gratings each comprise an arrayed waveguide gratings or echelle gratings.

14. A system comprising:
a laser frequency comb (LFC), a laser, or a communications network, or a spectrometer coupled to the device of claim 1, wherein the system transmits the input electromagnetic radiation to the input and/or receives the output electromagnetic radiation from the single output port.

15. The system of claim 14, wherein the system comprises the spectrometer and the output electromagnetic radiation has the desired output spectral intensity profile tailored for an interaction with a pre-determined molecular species.

16. An arbitrary spectral shaper comprising the device of claim 1.

17. A gain flattening filter comprising the device of claim 1.

18. An optical switch comprising the device of claim 1.

19. The device of claim 1, wherein the spectral channels comprise cascaded spectral channels wherein a plurality of the spectral channels are further split into an additional stage of sub-channels comprising narrower subbands and each having their amplitude and their phase individually modulated by the modulator.

20. The device of claim 1, wherein the drop ports couple the rejected portions of the electromagnetic radiation to a spectrum analyzer for measurement of the frequency spectrum of the desired output spectral intensity profile.

* * * * *